US012208041B2

(12) United States Patent
Poulos et al.

(10) Patent No.: US 12,208,041 B2
(45) Date of Patent: Jan. 28, 2025

(54) BED WITH FRAME ASSEMBLY

(71) Applicant: Kreg Medical, Inc., Melrose Park, IL (US)

(72) Inventors: Craig Poulos, Wilmette, IL (US); Luke Westra, Chicago, IL (US); Patrick Harris, Downers Grove, IL (US)

(73) Assignee: Kreg Medical, Inc., Melrose Park, IL (US)

( * ) Notice: Subject to any disclaimer, the term of this patent is extended or adjusted under 35 U.S.C. 154(b) by 509 days.

(21) Appl. No.: 16/844,691

(22) Filed: Apr. 9, 2020

(65) Prior Publication Data

US 2020/0230002 A1 Jul. 23, 2020

Related U.S. Application Data

(63) Continuation of application No. 16/118,015, filed on Aug. 30, 2018, now Pat. No. 10,617,582, which is a
(Continued)

(51) Int. Cl.

| | |
|---|---|
| ***A61G 7/015*** | (2006.01) |
| ***A61G 5/00*** | (2006.01) |
| ***A61G 7/005*** | (2006.01) |
| ***A61G 7/012*** | (2006.01) |
| ***A61G 7/018*** | (2006.01) |

(Continued)

(52) U.S. Cl.
CPC ............ *A61G 7/015* (2013.01); *A61G 7/012* (2013.01); *A61G 7/018* (2013.01); *A61G 7/0509* (2016.11); *A61G 7/0514* (2016.11); *A61G 7/0755* (2013.01); *A61G 7/16* (2013.01); *A61G 5/006* (2013.01); *A61G 7/005* (2013.01); *A61G 2200/16* (2013.01)

(58) Field of Classification Search
CPC ...... A61G 7/015; A61G 7/012; A61G 7/0755; A61G 7/16; A61G 2007/0509; A61G 2200/16; A61G 2007/0514; A61G 7/005; A61G 5/006; A61G 7/0509; A61G 7/0514; A61G 7/018
See application file for complete search history.

(56) References Cited

U.S. PATENT DOCUMENTS

| | | | |
|---|---|---|---|
| 53,041 | A | 3/1866 | Puffer |
| 358,466 | A | 3/1887 | Lueders |

(Continued)

FOREIGN PATENT DOCUMENTS

| | | | |
|---|---|---|---|
| CA | 2580314 | C | 3/2011 |
| CA | 2618630 | C | 10/2011 |

(Continued)

OTHER PUBLICATIONS

Oct. 30, 2009—(WO) ISR—App. No. PCT/US09/03811.
(Continued)

*Primary Examiner* — Eric J Kurilla
(74) *Attorney, Agent, or Firm* — Leydig, Voit & Mayer, Ltd.; John Augustyn

(57) ABSTRACT

A bed that converts into a chair is provided. The bed includes a base frame assembly, an intermediate frame assembly and a patient support deck. The patient support deck includes a head deck section, an intermediate deck section and a foot deck section.

22 Claims, 18 Drawing Sheets

Related U.S. Application Data continuation of application No. 14/840,748, filed on Aug. 31, 2015, now Pat. No. 10,064,771, which is a continuation-in-part of application No. 12/459,207, filed on Jun. 26, 2009, now Pat. No. 9,119,753.

(60) Provisional application No. 61/133,267, filed on Jun. 27, 2008.

(51) Int. Cl.
*A61G 7/05* (2006.01)
*A61G 7/075* (2006.01)
*A61G 7/16* (2006.01)

(56) References Cited

U.S. PATENT DOCUMENTS

| | | | | |
|---|---|---|---|---|
| 375,448 | A | 12/1887 | Hayward | |
| 628,700 | A | 7/1899 | Dann | |
| 1,133,798 | A | 3/1915 | Hall | |
| 1,253,179 | A | 1/1918 | Irrgang | |
| 1,398,203 | A | 11/1921 | Schmidt | |
| 1,525,864 | A | 2/1925 | Hueseman | |
| 1,636,325 | A | 7/1927 | Roe | |
| 1,772,310 | A | 8/1930 | Hart | |
| 1,999,106 | A | 4/1935 | Muller | |
| 2,034,985 | A | 3/1936 | Lilley | |
| 2,171,251 | A | 8/1939 | Capron | |
| 2,262,288 | A | 11/1941 | Raleigh | |
| 2,308,592 | A | 1/1943 | Drexler et al. | |
| 2,472,675 | A | 6/1949 | Mueller | |
| 2,514,655 | A | 7/1950 | Luketa | |
| 2,562,339 | A | 7/1951 | Socol | |
| 2,656,876 | A | 10/1953 | Larrick | |
| 2,658,211 | A | 11/1953 | Bendersky | |
| 2,675,285 | A | 4/1954 | Terry | |
| 2,766,463 | A | 10/1956 | Bendersky | |
| 2,783,055 | A | 2/1957 | Michaud | |
| 2,817,855 | A | 12/1957 | Pratt | |
| 2,830,304 | A | 4/1958 | Ericsson | |
| 2,956,290 | A | 10/1960 | Scheinerman | |
| 3,045,259 | A | 7/1962 | Mayer | |
| 3,064,278 | A | 11/1962 | Broyles | |
| 3,081,463 | A | 3/1963 | Williams et al. | |
| 3,090,971 | A | 5/1963 | MacDonald | |
| 3,093,839 | A | 6/1963 | Higgins | |
| 3,094,713 | A | 6/1963 | Wise | |
| 3,112,500 | A | 12/1963 | MacDonald | |
| 3,149,349 | A | 9/1964 | Nelson | |
| 3,174,161 | A | 3/1965 | Black | |
| 3,210,779 | A | 10/1965 | Herbold | |
| 3,220,022 | A | 11/1965 | Nelson | |
| 3,234,570 | A | 2/1966 | Hutt | |
| 3,237,212 | A | 3/1966 | Hillenbrand et al. | |
| 3,239,853 | A | 3/1966 | MacDonald | |
| 3,262,133 | A | 7/1966 | Beitzel | |
| 3,281,141 | A | 10/1966 | Smiley et al. | |
| 3,327,328 | A | 6/1967 | Slivoski | |
| 3,394,415 | A | 7/1968 | Parker | |
| 3,422,929 | A | 1/1969 | Oja | |
| 3,477,071 | A | 11/1969 | Emerson | |
| 3,485,240 | A | 12/1969 | Fountain | |
| 3,486,176 | A | 12/1969 | Murcott | |
| 3,495,869 | A | 2/1970 | Ingemansson | |
| 3,506,989 | A | 4/1970 | Ross et al. | |
| 3,585,660 | A | 6/1971 | Gottfried et al. | |
| 3,593,350 | A | 7/1971 | Knight et al. | |
| 3,605,145 | A | 9/1971 | Graebe | |
| 3,640,520 | A | 2/1972 | Wieland | |
| 3,646,621 | A | 3/1972 | Fragas | |
| 3,695,701 | A | 10/1972 | Knabusch et al. | |
| 3,701,173 | A | 10/1972 | Whitney | |
| 3,717,885 | A | 2/1973 | Mare | |
| 3,781,060 | A | 12/1973 | Pentzien | |
| 3,872,525 | A | 3/1975 | Lea et al. | |
| 3,877,088 | A | 4/1975 | Bouman | |
| 3,930,273 | A | 1/1976 | Stern | |
| 3,932,903 | A | 1/1976 | Adams et al. | |
| 3,971,083 | A | 7/1976 | Peterson | |
| 3,974,530 | A | 8/1976 | Lusch et al. | |
| 3,997,926 | A | 12/1976 | England | |
| 4,017,118 | A * | 4/1977 | Cawley | A61G 15/125 297/284.6 |
| 4,042,988 | A | 8/1977 | Holliday | |
| 4,084,274 | A | 4/1978 | Willis et al. | |
| 4,103,376 | A | 8/1978 | Benoit et al. | |
| 4,127,906 | A * | 12/1978 | Zur | A61G 7/02 297/DIG. 10 |
| 4,139,917 | A | 2/1979 | Fenwick | |
| 4,152,795 | A | 5/1979 | Rodosta et al. | |
| 4,175,550 | A | 11/1979 | Leininger et al. | |
| 4,183,109 | A | 1/1980 | Howell | |
| 4,188,677 | A | 2/1980 | Zur | |
| 4,224,706 | A | 9/1980 | Young et al. | |
| 4,225,988 | A | 10/1980 | Cary et al. | |
| 4,227,269 | A | 10/1980 | Johnston | |
| 4,258,445 | A | 3/1981 | Zur | |
| 4,270,233 | A | 6/1981 | Mulligan | |
| 4,271,547 | A | 6/1981 | Grossutti | |
| 4,277,858 | A | 7/1981 | Bohme | |
| 4,346,487 | A | 8/1982 | Holdt | |
| 4,370,765 | A | 2/1983 | Webber | |
| 4,375,706 | A | 3/1983 | Finnhult | |
| 4,376,317 | A | 3/1983 | Johnston | |
| 4,391,009 | A | 7/1983 | Schild et al. | |
| 4,409,695 | A | 10/1983 | Johnston et al. | |
| 4,432,359 | A | 2/1984 | James | |
| 4,449,261 | A | 5/1984 | Magnusson | |
| 4,485,505 | A | 12/1984 | Paul | |
| 4,494,259 | A | 1/1985 | Miller et al. | |
| 4,507,814 | A | 4/1985 | Zyki, Jr. | |
| 4,509,217 | A | 4/1985 | Therrien | |
| 4,545,084 | A | 10/1985 | Peterson | |
| 4,612,679 | A | 9/1986 | Mitchell | |
| 4,613,182 | A | 9/1986 | Stone | |
| 4,613,997 | A | 9/1986 | Langdale | |
| 4,632,450 | A | 12/1986 | Holdt | |
| 4,639,954 | A | 2/1987 | Speed | |
| 4,653,129 | A | 3/1987 | Kuck et al. | |
| 4,654,903 | A | 4/1987 | Chubb et al. | |
| 4,658,450 | A | 4/1987 | Thompson | |
| 4,669,136 | A | 6/1987 | Waters et al. | |
| 4,672,698 | A | 6/1987 | Sands | |
| 4,679,569 | A | 7/1987 | Lee | |
| 4,686,725 | A | 8/1987 | Mitchell | |
| 4,700,417 | A | 10/1987 | McGovern | |
| 4,706,313 | A | 11/1987 | Murphy | |
| 4,709,790 | A | 12/1987 | Freitag et al. | |
| 4,724,554 | A | 2/1988 | Kowalski et al. | |
| 4,724,555 | A | 2/1988 | Poehner et al. | |
| 4,787,104 | A | 11/1988 | Grantham | |
| 4,821,351 | A | 4/1989 | Bergenwall | |
| 4,829,616 | A | 5/1989 | Walker | |
| 4,847,929 | A | 7/1989 | Pupovic | |
| 4,852,195 | A | 8/1989 | Shulman | |
| 4,862,529 | A | 9/1989 | Peck | |
| 4,862,530 | A | 9/1989 | Chen | |
| 4,862,538 | A | 9/1989 | Spann et al. | |
| 4,864,671 | A | 9/1989 | Evans | |
| 4,897,890 | A | 2/1990 | Walker | |
| 4,899,404 | A | 2/1990 | Galumbeck | |
| 4,901,387 | A | 2/1990 | Luke | |
| 4,918,829 | A | 4/1990 | Harris | |
| 4,941,221 | A | 7/1990 | Kanzler | |
| 4,944,054 | A | 7/1990 | Bossert | |
| 4,947,496 | A | 8/1990 | Connolly | |
| 4,947,500 | A | 8/1990 | Seiler | |
| 4,949,414 | A | 8/1990 | Thomas et al. | |
| 4,953,243 | A | 9/1990 | Birkmann | |
| 4,953,247 | A | 9/1990 | Hasty | |
| 4,962,552 | A | 10/1990 | Hasty | |
| 4,977,629 | A | 12/1990 | Jones | |
| 4,985,946 | A | 1/1991 | Foster et al. | |
| 4,986,738 | A | 1/1991 | Kawasaki et al. | |

(56) References Cited

U.S. PATENT DOCUMENTS

| | | | |
|---|---|---|---|
| 4,993,089 | A | 2/1991 | Solomon et al. |
| 4,997,200 | A | 3/1991 | Earls |
| 5,023,967 | A | 6/1991 | Ferrand |
| 5,025,519 | A | 6/1991 | Spann et al. |
| 5,031,261 | A | 7/1991 | Fenner, Sr. |
| 5,039,158 | A | 8/1991 | Maier |
| 5,040,253 | A | 8/1991 | Cheng |
| 5,050,899 | A | 9/1991 | Stensby |
| 5,070,560 | A | 12/1991 | Wilkinson |
| 5,072,463 | A | 12/1991 | Willis |
| 5,077,843 | A | 1/1992 | Foster L. Dale et al. |
| 5,083,332 | A | 1/1992 | Foster et al. |
| 5,083,334 | A | 1/1992 | Huck et al. |
| 5,084,925 | A | 2/1992 | Cook |
| 5,092,007 | A | 3/1992 | Hasty |
| 5,095,561 | A | 3/1992 | Green et al. |
| 5,103,519 | A | 4/1992 | Hasty |
| 5,107,558 | A | 4/1992 | Lück |
| 5,109,560 | A | 5/1992 | Uetake |
| 5,117,521 | A | 6/1992 | Foster et al. |
| 5,121,513 | A | 6/1992 | Thomas et al. |
| 5,129,115 | A | 7/1992 | Higgins et al. |
| 5,129,116 | A | 7/1992 | Borders et al. |
| 5,129,117 | A | 7/1992 | Celestina et al. |
| 5,157,787 | A | 10/1992 | Donnellan et al. |
| 5,157,800 | A | 10/1992 | Borders |
| 5,163,196 | A | 11/1992 | Graebe et al. |
| 5,169,208 | A | 12/1992 | Re et al. |
| 5,179,742 | A | 1/1993 | Oberle |
| 5,179,744 | A | 1/1993 | Foster et al. |
| 5,182,826 | A | 2/1993 | Thomas et al. |
| 5,187,824 | A | 2/1993 | Stryker |
| 5,214,809 | A | 6/1993 | Stuart |
| 5,224,228 | A | 7/1993 | Larrimore |
| 5,230,113 | A | 7/1993 | Foster et al. |
| 5,233,974 | A | 8/1993 | Senoue et al. |
| 5,243,721 | A | 9/1993 | Teasdale |
| 5,249,319 | A | 10/1993 | Higgs |
| 5,252,278 | A | 10/1993 | Spann et al. |
| 5,259,079 | A | 11/1993 | Visser et al. |
| 5,267,365 | A | 12/1993 | Walter |
| 5,279,010 | A | 1/1994 | Ferrand et al. |
| 5,325,551 | A | 7/1994 | Tappel et al. |
| 5,329,657 | A | 7/1994 | Bartley et al. |
| 5,331,698 | A | 7/1994 | Newkirk et al. |
| 5,335,651 | A | 8/1994 | Foster et al. |
| 5,337,845 | A | 8/1994 | Foster et al. |
| 5,342,114 | A | 8/1994 | Burke et al. |
| 5,347,682 | A | 9/1994 | Edgerton, Jr. |
| 5,348,367 | A | 9/1994 | Mizelle |
| 5,366,036 | A | 11/1994 | Perry |
| 5,370,111 | A | 12/1994 | Reeder et al. |
| 5,375,910 | A * | 12/1994 | Murphy .................. A61G 5/14 297/DIG. 10 |
| 5,377,370 | A | 1/1995 | Foster et al. |
| D355,322 | S | 2/1995 | Ackley et al. |
| 5,394,581 | A | 3/1995 | Leoutsakos |
| 5,398,354 | A | 3/1995 | Balonick et al. |
| 5,398,357 | A | 3/1995 | Foster |
| 5,402,544 | A | 4/1995 | Crawford et al. |
| 5,412,821 | A | 5/1995 | Wilkinson |
| 5,425,148 | A | 6/1995 | Ashcraft et al. |
| 5,444,883 | A | 8/1995 | Lura |
| 5,454,126 | A | 10/1995 | Foster et al. |
| 5,454,142 | A | 10/1995 | Neely et al. |
| 5,457,831 | A | 10/1995 | Foster et al. |
| 5,461,741 | A | 10/1995 | Graebe |
| 5,479,665 | A | 1/1996 | Cassidy et al. |
| 5,479,666 | A | 1/1996 | Foster et al. |
| 5,481,770 | A | 1/1996 | Ahlsten |
| 5,481,772 | A | 1/1996 | Glynn et al. |
| 5,483,709 | A | 1/1996 | Foster et al. |
| 5,485,699 | A | 1/1996 | Gabhart |
| 5,487,196 | A | 1/1996 | Wilkinson et al. |
| 5,497,766 | A | 3/1996 | Foster et al. |
| 5,502,853 | A | 4/1996 | Singleton et al. |
| 5,507,562 | A | 4/1996 | Wieland |
| 5,513,406 | A | 5/1996 | Foster et al. |
| 5,542,136 | A * | 8/1996 | Tappel ............... A61G 7/05776 5/713 |
| 5,551,107 | A | 9/1996 | Graebe |
| 5,562,091 | A | 10/1996 | Foster et al. |
| 5,568,660 | A | 10/1996 | Raburn et al. |
| 5,577,279 | A | 11/1996 | Foster et al. |
| 5,580,504 | A | 12/1996 | Spann et al. |
| 5,586,346 | A | 12/1996 | Stacy et al. |
| 5,596,781 | A | 1/1997 | Graebe |
| 5,603,133 | A | 2/1997 | Vrzalik |
| 5,604,942 | A | 2/1997 | Allevato et al. |
| 5,606,754 | A | 3/1997 | Hand et al. |
| 5,611,096 | A | 3/1997 | Bartlett et al. |
| 5,613,252 | A | 3/1997 | Yu et al. |
| 5,613,255 | A | 3/1997 | Bish et al. |
| 5,620,066 | A | 4/1997 | Schuttler |
| 5,628,078 | A | 5/1997 | Pennington et al. |
| 5,630,238 | A | 5/1997 | Weismiller et al. |
| 5,634,224 | A | 6/1997 | Gates |
| 5,638,563 | A | 6/1997 | Lura |
| 5,642,546 | A | 7/1997 | Shoenhair |
| 5,649,331 | A | 7/1997 | Wilkinson et al. |
| 5,652,985 | A | 8/1997 | Wilkinson et al. |
| 5,659,910 | A | 8/1997 | Weiss |
| 5,666,681 | A | 9/1997 | Meyer et al. |
| 5,672,849 | A | 9/1997 | Foster et al. |
| 5,680,661 | A | 10/1997 | Foster et al. |
| 5,682,631 | A | 11/1997 | Weismiller et al. |
| 5,689,845 | A | 11/1997 | Sobieralski |
| 5,692,256 | A | 12/1997 | Kramer et al. |
| 5,699,566 | A | 12/1997 | Chuang |
| 5,708,997 | A | 1/1998 | Foster et al. |
| 5,715,548 | A | 2/1998 | Weismiller et al. |
| 5,724,685 | A | 3/1998 | Weismiller et al. |
| 5,731,062 | A | 3/1998 | Kim et al. |
| 5,732,423 | A | 3/1998 | Weismiller et al. |
| 5,742,957 | A * | 4/1998 | Vanzant .................. A61G 5/14 297/DIG. 10 |
| 5,745,936 | A | 5/1998 | Van McCutchen et al. |
| 5,745,937 | A | 5/1998 | Weismiller et al. |
| 5,749,112 | A | 5/1998 | Metzler |
| 5,771,511 | A | 6/1998 | Kummer et al. |
| 5,781,949 | A | 7/1998 | Weismiller et al. |
| 5,784,732 | A | 7/1998 | Vail |
| 5,790,997 | A | 8/1998 | Ruehl |
| 5,832,549 | A | 11/1998 | Le Pallec et al. |
| 5,845,352 | A | 12/1998 | Matsler et al. |
| 5,857,739 | A | 1/1999 | Smith |
| 5,860,899 | A | 1/1999 | Rassman |
| 5,878,452 | A | 3/1999 | Brooke et al. |
| 5,926,878 | A | 7/1999 | Morton et al. |
| 5,933,888 | A | 8/1999 | Foster et al. |
| 5,940,910 | A | 8/1999 | Weismiller et al. |
| 5,963,998 | A | 10/1999 | Carew et al. |
| 5,983,429 | A | 11/1999 | Stacy et al. |
| 5,987,668 | A | 11/1999 | Ackley |
| 5,996,150 | A | 12/1999 | Blevins et al. |
| 6,000,076 | A | 12/1999 | Webster et al. |
| 6,036,271 | A | 3/2000 | Wilkinson et al. |
| 6,038,717 | A | 3/2000 | Persson |
| 6,038,721 | A | 3/2000 | Gordon |
| 6,047,422 | A | 4/2000 | Yousif |
| 6,047,424 | A | 4/2000 | Osborne et al. |
| 6,058,531 | A | 5/2000 | Carroll |
| 6,058,533 | A | 5/2000 | Nelson |
| 6,089,593 | A | 7/2000 | Hanson et al. |
| 6,095,610 | A | 8/2000 | Okajima et al. |
| 6,098,222 | A | 8/2000 | Hand et al. |
| 6,112,345 | A | 9/2000 | Foster et al. |
| 6,112,867 | A | 9/2000 | Mintgen et al. |
| 6,119,291 | A | 9/2000 | Osborne et al. |
| 6,141,806 | A | 11/2000 | Bobey et al. |
| 6,151,739 | A | 11/2000 | Meyer et al. |
| 6,154,899 | A | 12/2000 | Brooke et al. |
| 6,163,903 | A | 12/2000 | Weismiller et al. |
| 6,182,310 | B1 | 2/2001 | Weismiller et al. |

(56) References Cited

U.S. PATENT DOCUMENTS

| | | | |
|---|---|---|---|
| 6,212,714 B1 | 4/2001 | Allen et al. | |
| 6,223,369 B1 | 5/2001 | Maier et al. | |
| 6,230,346 B1 | 5/2001 | Branson et al. | |
| 6,240,583 B1 | 6/2001 | Brooke et al. | |
| 6,253,397 B1 | 7/2001 | Bartow et al. | |
| 6,256,812 B1 | 7/2001 | Bartow et al. | |
| 6,256,821 B1 | 7/2001 | Boyd | |
| 6,256,822 B1 | 7/2001 | Weston et al. | |
| 6,269,504 B1 | 8/2001 | Romano et al. | |
| 6,269,505 B1 | 8/2001 | Wilkinson | |
| 6,272,702 B1 | 8/2001 | Uchida et al. | |
| 6,282,735 B1 | 9/2001 | Stolpmann et al. | |
| 6,282,737 B1 | 9/2001 | Vrzalik | |
| 6,286,166 B1 | 9/2001 | Henley et al. | |
| 6,295,675 B1 | 10/2001 | Ellis et al. | |
| 6,296,089 B1 | 10/2001 | Koch et al. | |
| 6,315,319 B1 | 11/2001 | Hanson et al. | |
| 6,320,510 B2 | 11/2001 | Menkedick et al. | |
| 6,324,709 B1 | 12/2001 | Ikeda et al. | |
| 6,336,235 B1 | 1/2002 | Ruehl | |
| 6,347,422 B2 | 2/2002 | Heavrin | |
| 6,351,863 B1 | 3/2002 | Meyer et al. | |
| 6,353,950 B1 | 3/2002 | Bartlett et al. | |
| 6,357,065 B1 | 3/2002 | Adams | |
| 6,360,385 B1 | 3/2002 | Lewandowski | |
| 6,363,552 B1 | 4/2002 | Hornbach et al. | |
| 6,374,436 B1 | 4/2002 | Foster | |
| 6,374,437 B1 | 4/2002 | Voelker | |
| 6,397,416 B2 | 6/2002 | Brooke et al. | |
| 6,401,277 B1 | 6/2002 | Savage et al. | |
| 6,415,814 B1 | 7/2002 | Hand et al. | |
| 6,427,264 B1 | 8/2002 | Metz et al. | |
| 6,427,270 B1 | 8/2002 | Blevins et al. | |
| 6,446,283 B1 | 9/2002 | Heimbrock et al. | |
| 6,460,930 B2 | 10/2002 | Thornton | |
| 6,481,033 B2 | 11/2002 | Fogel | |
| 6,484,332 B2 | 11/2002 | Korver, II | |
| 6,496,993 B2 | 12/2002 | Allen et al. | |
| 6,499,163 B1 | 12/2002 | Stensby | |
| 6,499,167 B1 | 12/2002 | Ellis et al. | |
| 6,505,368 B1 | 1/2003 | Ellis | |
| 6,516,479 B1 | 2/2003 | Barbour | |
| 6,526,609 B2 | 3/2003 | Wong | |
| 6,536,056 B1 | 3/2003 | Vrzalik et al. | |
| 6,539,566 B1 | 4/2003 | Hayes | |
| 6,547,330 B1 | 4/2003 | Hester | |
| 6,560,793 B2 | 5/2003 | Walker | |
| 6,564,409 B2 | 5/2003 | Metz et al. | |
| 6,565,112 B2 | 5/2003 | Hanson et al. | |
| 6,584,628 B1 | 7/2003 | Kummer et al. | |
| 6,584,629 B2 | 7/2003 | Tsuji et al. | |
| 6,601,251 B2 | 8/2003 | Paul | |
| 6,601,253 B1 | 8/2003 | Tarquinio | |
| 6,611,979 B2 | 9/2003 | Welling et al. | |
| 6,622,323 B2 | 9/2003 | Zerhusen et al. | |
| 6,622,364 B2 | 9/2003 | Hamilton et al. | |
| 6,623,080 B2 | 9/2003 | Clapper | |
| 6,640,360 B2 | 11/2003 | Hornbach et al. | |
| 6,640,361 B2 | 11/2003 | Heimbrock et al. | |
| 6,643,873 B2 | 11/2003 | Heimbrock et al. | |
| 6,651,281 B1 | 11/2003 | Figiel | |
| 6,654,974 B2 | 12/2003 | Ruehl et al. | |
| 6,658,680 B2 | 12/2003 | Osborne et al. | |
| 6,662,393 B2 | 12/2003 | Boyd | |
| 6,663,184 B2 | 12/2003 | Hagiike | |
| 6,675,415 B2 | 1/2004 | Wong | |
| 6,678,908 B2 | 1/2004 | Borders et al. | |
| 6,684,427 B2 | 2/2004 | Allen et al. | |
| 6,684,436 B1 | 2/2004 | Lovelace | |
| 6,684,472 B2 | 2/2004 | Abdelmoula et al. | |
| 6,687,936 B2 | 2/2004 | Graebe et al. | |
| 6,691,346 B2 | 2/2004 | Osborne et al. | |
| 6,691,348 B2 | 2/2004 | Plummer et al. | |
| 6,691,349 B2 | 2/2004 | Blevins | |
| 6,691,350 B2 | 2/2004 | Weismiller | |
| 6,692,069 B2 | 2/2004 | Beroth et al. | |
| 6,694,548 B2 | 2/2004 | Foster et al. | |
| 6,694,549 B2 | 2/2004 | Perez et al. | |
| 6,694,557 B1 | 2/2004 | Bobey et al. | |
| 6,695,406 B2 | 2/2004 | Plant | |
| 6,698,836 B1 | 3/2004 | Veneruso | |
| 6,701,556 B2 | 3/2004 | Romano et al. | |
| 6,704,954 B2 | 3/2004 | Metz et al. | |
| 6,704,956 B2 | 3/2004 | Riley et al. | |
| 6,708,358 B2 | 3/2004 | Hensley | |
| 6,715,169 B2 | 4/2004 | Niederkrom | |
| 6,721,975 B1 | 4/2004 | Lemire | |
| 6,725,474 B2 | 4/2004 | Foster et al. | |
| 6,725,479 B1 | 4/2004 | Stryker et al. | |
| 6,726,279 B1 | 4/2004 | Figel et al. | |
| 6,728,983 B2 | 5/2004 | Bartlett et al. | |
| 6,728,985 B2 | 5/2004 | Brooke et al. | |
| 6,732,390 B2 | 5/2004 | Krywiczanin | |
| 6,745,996 B1 | 6/2004 | Guthrie | |
| 6,751,815 B2 | 6/2004 | Heimbrock et al. | |
| 6,757,924 B2 | 7/2004 | Goodwin et al. | |
| 6,779,209 B2 | 8/2004 | Ganance | |
| 6,779,340 B2 | 8/2004 | Pfaff et al. | |
| 6,781,517 B2 | 8/2004 | Moster et al. | |
| 6,782,574 B2 | 8/2004 | Totton et al. | |
| 6,791,460 B2 | 9/2004 | Dixon et al. | |
| 6,799,340 B2 | 10/2004 | Schatz | |
| 6,817,363 B2 | 11/2004 | Biondo et al. | |
| 6,820,293 B2 | 11/2004 | Alverson | |
| 6,820,294 B2 | 11/2004 | Shiery et al. | |
| 6,820,640 B2 | 11/2004 | Hand et al. | |
| 6,822,571 B2 | 11/2004 | Conway | |
| 6,823,549 B1 * | 11/2004 | Hampton | A61G 5/1043 297/284.6 |
| 6,826,793 B2 | 12/2004 | Tekulve | |
| 6,826,795 B2 | 12/2004 | Wilkinson | |
| 6,829,793 B2 | 12/2004 | Brooke et al. | |
| 6,829,796 B2 | 12/2004 | Salvatini et al. | |
| 6,839,926 B2 | 1/2005 | Heimbrock et al. | |
| 6,846,042 B2 | 1/2005 | Hanson et al. | |
| 6,851,142 B2 | 2/2005 | Stryker et al. | |
| 6,854,145 B2 | 2/2005 | Ruehl et al. | |
| 6,862,759 B2 | 3/2005 | Hand et al. | |
| 6,862,762 B1 | 3/2005 | Johnson et al. | |
| 6,866,341 B2 | 3/2005 | Behnert | |
| 6,874,179 B2 | 4/2005 | Hensley et al. | |
| 6,874,185 B1 | 4/2005 | Phillips et al. | |
| 6,874,800 B2 | 4/2005 | George | |
| 6,880,186 B2 | 4/2005 | Johansson | |
| 6,880,189 B2 | 4/2005 | Welling et al. | |
| 6,892,405 B1 | 5/2005 | Dimitriu et al. | |
| 6,897,780 B2 | 5/2005 | Ulrich et al. | |
| 6,901,617 B2 | 6/2005 | Sprouse et al. | |
| 6,904,631 B2 | 6/2005 | Vrzalik et al. | |
| 6,910,236 B2 | 6/2005 | Rene | |
| 6,922,863 B2 | 8/2005 | Giori et al. | |
| 6,924,441 B1 | 8/2005 | Mobley et al. | |
| 6,926,366 B2 | 8/2005 | Wolters | |
| 6,928,673 B2 | 8/2005 | Risk, Jr. | |
| 6,928,681 B1 | 8/2005 | Stacy | |
| 6,934,987 B2 | 8/2005 | Newkirk et al. | |
| 6,938,289 B2 | 9/2005 | Morin | |
| 6,951,036 B2 | 10/2005 | Lemire | |
| 6,952,846 B2 | 10/2005 | Flannery et al. | |
| 6,952,852 B2 | 10/2005 | Reeder et al. | |
| 6,976,281 B2 | 12/2005 | Schunk et al. | |
| 6,978,501 B2 | 12/2005 | Vrzalik | |
| 6,990,700 B2 | 1/2006 | Chung | |
| 6,993,799 B2 | 2/2006 | Foster et al. | |
| 7,000,272 B2 | 2/2006 | Allen et al. | |
| 7,007,323 B2 | 3/2006 | Zerhusen et al. | |
| 7,017,208 B2 | 3/2006 | Weismiller et al. | |
| 7,028,352 B2 | 4/2006 | Kramer et al. | |
| 7,028,358 B2 | 4/2006 | Liu | |
| 7,036,166 B2 | 5/2006 | Kramer et al. | |
| 7,039,972 B2 | 5/2006 | Chaffee | |
| 7,044,460 B2 | 5/2006 | Bolton | |
| 7,076,818 B2 | 7/2006 | Kummer et al. | |
| 7,082,635 B2 | 8/2006 | Barman et al. | |

(56) References Cited

U.S. PATENT DOCUMENTS

| | | | | |
|---|---|---|---|---|
| 7,086,107 | B2 | 8/2006 | Ellis et al. | |
| 7,107,636 | B2 | 9/2006 | Metz | |
| 7,107,637 | B2 | 9/2006 | Kuek et al. | |
| 7,111,340 | B2 | 9/2006 | Mitchell et al. | |
| 7,114,207 | B2 | 10/2006 | Wang | |
| 7,120,950 | B2 | 10/2006 | Garrigues | |
| 7,120,955 | B2 | 10/2006 | Wang | |
| 7,127,762 | B1 | 10/2006 | Lau | |
| 7,171,708 | B2 | 2/2007 | Osborne et al. | |
| 7,182,323 | B2 | 2/2007 | Muller | |
| 7,188,379 | B2 | 3/2007 | James et al. | |
| 7,191,482 | B2 | 3/2007 | Romano et al. | |
| 7,191,483 | B2 | 3/2007 | Hochschild | |
| 7,213,279 | B2 | 5/2007 | Weismiller et al. | |
| 7,216,389 | B2 | 5/2007 | Ellis et al. | |
| 7,225,488 | B2 | 6/2007 | Wu | |
| 7,229,134 | B2 | 6/2007 | Ito | |
| 7,237,287 | B2 | 7/2007 | Weismiller et al. | |
| 7,237,471 | B2 | 7/2007 | Mintgen et al. | |
| 7,246,389 | B2 | 7/2007 | Taguchi et al. | |
| 7,260,860 | B2 | 8/2007 | Chambers et al. | |
| 7,263,734 | B1 | 9/2007 | Buchanan et al. | |
| 7,293,839 | B2 | 11/2007 | Shimizu | |
| 7,296,312 | B2 * | 11/2007 | Menkedick | A61G 7/05715 5/611 |
| 7,296,313 | B2 | 11/2007 | Hense | |
| 7,296,314 | B2 | 11/2007 | Wyatt et al. | |
| 7,313,837 | B2 | 1/2008 | Wang | |
| 7,325,265 | B2 | 2/2008 | Hornbach et al. | |
| 7,346,945 | B2 | 3/2008 | Phillips et al. | |
| 7,406,729 | B2 | 8/2008 | Hornbach et al. | |
| 7,412,734 | B2 | 8/2008 | Stryker et al. | |
| 7,430,771 | B2 | 10/2008 | Heimbrock | |
| 7,444,696 | B2 | 11/2008 | Lin et al. | |
| 7,458,119 | B2 | 12/2008 | Hornbach et al. | |
| 7,464,425 | B2 | 12/2008 | Chambers et al. | |
| 7,509,698 | B2 | 3/2009 | Poulos et al. | |
| 7,523,515 | B2 | 4/2009 | Allen et al. | |
| 7,536,739 | B2 | 5/2009 | Poulos et al. | |
| 7,568,247 | B2 | 8/2009 | Strobel et al. | |
| 7,587,776 | B2 | 9/2009 | Poulos et al. | |
| 7,600,817 | B2 * | 10/2009 | Kramer | A47C 1/023 297/DIG. 10 |
| 7,676,862 | B2 | 3/2010 | Poulos et al. | |
| 7,685,664 | B2 * | 3/2010 | Stolpmann | A61G 7/05715 5/710 |
| 7,698,761 | B2 | 4/2010 | Neuenswander et al. | |
| 7,716,766 | B2 | 5/2010 | Poulos et al. | |
| 7,743,441 | B2 | 6/2010 | Poulos et al. | |
| 7,757,318 | B2 | 7/2010 | Poulos et al. | |
| 7,774,876 | B2 | 8/2010 | Brown | |
| 7,779,494 | B2 | 8/2010 | Poulos et al. | |
| 7,784,128 | B2 * | 8/2010 | Kramer | A61G 7/0514 5/624 |
| 7,793,950 | B2 | 9/2010 | Van Eeden | |
| 7,832,528 | B1 | 11/2010 | Liang | |
| 7,836,531 | B2 | 11/2010 | Girard | |
| 8,056,160 | B2 | 11/2011 | Poulos et al. | |
| 8,063,785 | B2 | 11/2011 | Sacchetti | |
| 8,069,514 | B2 | 12/2011 | Poulos et al. | |
| 8,104,122 | B2 | 1/2012 | Richards et al. | |
| 8,104,123 | B2 * | 1/2012 | Paz | A61G 7/053 5/624 |
| RE43,155 | E | 2/2012 | Allen et al. | |
| 8,117,695 | B2 | 2/2012 | Paz | |
| 8,539,625 | B2 | 9/2013 | Poulos et al. | |
| 8,566,984 | B2 | 10/2013 | Paz et al. | |
| 8,590,073 | B2 | 11/2013 | Bly | |
| 8,793,824 | B2 | 8/2014 | Poulos | |
| 8,955,176 | B1 * | 2/2015 | Mullikin | A47C 19/04 5/183 |
| 9,119,753 | B2 | 9/2015 | Poulos et al. | |
| 9,320,663 | B2 | 4/2016 | Poulos et al. | |
| 9,687,401 | B2 | 6/2017 | Alford et al. | |
| 10,064,771 | B2 | 9/2018 | Poulos et al. | |
| 10,179,077 | B2 | 1/2019 | Poulos | |
| 10,617,582 | B2 | 4/2020 | Poulos et al. | |
| 10,744,054 | B2 | 8/2020 | Poulos et al. | |
| 11,103,405 | B2 | 8/2021 | Poulos et al. | |
| 11,116,684 | B2 | 9/2021 | Poulos | |
| 11,141,335 | B2 * | 10/2021 | Poulos | A61G 7/005 |
| 11,266,554 | B2 | 3/2022 | Poulos | |
| 11,458,056 | B2 | 10/2022 | Poulos et al. | |
| 11,523,955 | B2 | 12/2022 | Poulos et al. | |
| 2001/0048239 | A1 | 12/2001 | Kogure | |
| 2002/0059679 | A1 | 5/2002 | Weismiller | |
| 2002/0066142 | A1 * | 6/2002 | Osborne | A61G 7/0507 5/617 |
| 2002/0078509 | A1 | 6/2002 | Williams | |
| 2002/0174487 | A1 | 11/2002 | Kramer et al. | |
| 2003/0075966 | A1 | 4/2003 | Behnert | |
| 2003/0079293 | A1 | 5/2003 | Ellis et al. | |
| 2003/0080597 | A1 | 5/2003 | Beroth et al. | |
| 2003/0145383 | A1 | 8/2003 | Schwaegerle | |
| 2003/0167568 | A1 | 9/2003 | Brooke | |
| 2003/0172459 | A1 | 9/2003 | Roussy | |
| 2003/0177584 | A1 | 9/2003 | Boyd | |
| 2003/0208847 | A1 | 11/2003 | Vrzalik et al. | |
| 2003/0221262 | A1 | 12/2003 | Torbet et al. | |
| 2003/0221391 | A1 | 12/2003 | Bolton | |
| 2004/0010855 | A1 | 1/2004 | Piraino | |
| 2004/0034931 | A1 | 2/2004 | Kummer et al. | |
| 2004/0143904 | A1 | 7/2004 | Borders et al. | |
| 2004/0154097 | A1 | 8/2004 | Blevins | |
| 2004/0187217 | A1 | 9/2004 | Barman et al. | |
| 2004/0193078 | A1 | 9/2004 | Flick | |
| 2005/0012377 | A1 | 1/2005 | Ito | |
| 2005/0028289 | A1 | 2/2005 | Hakamiun | |
| 2005/0034764 | A1 | 2/2005 | Hanh et al. | |
| 2005/0076715 | A1 | 4/2005 | Kuklis et al. | |
| 2005/0104420 | A1 | 5/2005 | Murphy | |
| 2005/0160530 | A1 | 7/2005 | Taguchi et al. | |
| 2005/0166323 | A1 | 8/2005 | Kawakami et al. | |
| 2005/0166328 | A1 | 8/2005 | Ben-Levi | |
| 2005/0166330 | A1 | 8/2005 | Williams | |
| 2005/0172405 | A1 | 8/2005 | Menkedick | |
| 2005/0200180 | A1 * | 9/2005 | Guyton | A61G 7/1021 297/313 |
| 2005/0229321 | A1 | 10/2005 | Phillips et al. | |
| 2005/0262635 | A1 | 12/2005 | Wing | |
| 2006/0006724 | A1 | 1/2006 | Shimizu | |
| 2006/0021142 | A1 | 2/2006 | Hornbach et al. | |
| 2006/0021144 | A1 | 2/2006 | Hornbach et al. | |
| 2006/0021145 | A1 | 2/2006 | Hornbach et al. | |
| 2006/0026762 | A1 | 2/2006 | Hornbach et al. | |
| 2006/0026765 | A1 | 2/2006 | Hornbach et al. | |
| 2006/0026767 | A1 | 2/2006 | Chambers et al. | |
| 2006/0026768 | A1 | 2/2006 | Chambers et al. | |
| 2006/0031955 | A1 | 2/2006 | Barkhouse | |
| 2006/0031995 | A1 | 2/2006 | Barkhouse | |
| 2006/0053555 | A1 * | 3/2006 | Poulos | A01L 3/00 168/22 |
| 2006/0059621 | A1 | 3/2006 | Poulos et al. | |
| 2006/0059624 | A1 | 3/2006 | Poulos et al. | |
| 2006/0101581 | A1 | 5/2006 | Blanchard et al. | |
| 2006/0150321 | A1 * | 7/2006 | Brockman | A61G 7/1021 5/81.1 R |
| 2006/0167079 | A1 | 7/2006 | Menkedick et al. | |
| 2006/0168729 | A1 | 8/2006 | Weismiller et al. | |
| 2006/0168730 | A1 | 8/2006 | Menkedick et al. | |
| 2006/0168731 | A1 | 8/2006 | Menkedick et al. | |
| 2006/0195986 | A1 | 9/2006 | Hakamiun et al. | |
| 2006/0260051 | A1 | 11/2006 | Paz | |
| 2006/0272097 | A1 | 12/2006 | Dionne et al. | |
| 2006/0277683 | A1 | 12/2006 | Lamire | |
| 2007/0070684 | A1 | 3/2007 | Poulos | |
| 2007/0080030 | A1 | 4/2007 | Kramer | |
| 2007/0113352 | A1 | 5/2007 | Poulos | |
| 2007/0163043 | A1 | 7/2007 | Lemire et al. | |
| 2007/0169267 | A1 | 7/2007 | Paz et al. | |
| 2007/0234477 | A1 | 10/2007 | Dorenbeck | |
| 2007/0266499 | A1 | 11/2007 | O'Keefe et al. | |
| 2008/0086815 | A1 | 4/2008 | Kappeler et al. | |

(56) References Cited

U.S. PATENT DOCUMENTS

| | | | |
|---|---|---|---|
| 2008/0201851 A1 | 8/2008 | Menkedick et al. | |
| 2008/0211248 A1 | 9/2008 | Lambarth | |
| 2009/0106906 A1* | 4/2009 | Soltani | A61G 7/05769 5/713 |
| 2009/0300845 A1 | 12/2009 | Paz et al. | |
| 2010/0005592 A1 | 1/2010 | Poulos et al. | |
| 2010/0325794 A1 | 12/2010 | Chung | |
| 2011/0030142 A1* | 2/2011 | Karwal | A61G 7/005 5/608 |
| 2011/0113556 A1 | 5/2011 | Roussy | |
| 2012/0066832 A1 | 3/2012 | Poulos et al. | |
| 2012/0073052 A1 | 3/2012 | Meyer et al. | |
| 2012/0096644 A1 | 4/2012 | Heimbrock | |
| 2012/0144588 A1* | 6/2012 | Heimbrock | A61G 7/16 5/624 |
| 2012/0198613 A1 | 8/2012 | Jelinek | |
| 2012/0198629 A1 | 8/2012 | Hornbach | |
| 2012/0286557 A1 | 11/2012 | Hoffman et al. | |
| 2013/0139318 A1 | 6/2013 | Paz | |
| 2013/0145550 A1 | 6/2013 | Roussy et al. | |
| 2015/0007393 A1 | 1/2015 | Palashewski | |
| 2015/0237432 A1 | 10/2015 | Poulos | |
| 2016/0074265 A1 | 3/2016 | Lyon | |
| 2016/0193095 A1* | 7/2016 | Roussy | A61G 7/0524 5/616 |
| 2017/0281440 A1 | 10/2017 | Puvogel | |
| 2018/0160820 A1 | 6/2018 | Hsu | |
| 2019/0076310 A1 | 3/2019 | Poulos | |
| 2019/0142671 A1 | 5/2019 | Poulos et al. | |
| 2019/0142672 A1 | 5/2019 | Poulos et al. | |
| 2019/0142673 A1 | 5/2019 | Poulos et al. | |
| 2019/0262201 A1 | 8/2019 | Borgman | |
| 2020/0008994 A1 | 1/2020 | Poulos et al. | |
| 2020/0008995 A1 | 1/2020 | Poulos et al. | |
| 2021/0177680 A1 | 6/2021 | Poulos et al. | |
| 2022/0023125 A1 | 1/2022 | Poulos et al. | |
| 2022/0023126 A1 | 1/2022 | Poulos et al. | |
| 2023/0113787 A1 | 4/2023 | Poulos et al. | |
| 2023/0181397 A1 | 6/2023 | Poulos et al. | |
| 2024/0082089 A1 | 3/2024 | Poulos et al. | |

FOREIGN PATENT DOCUMENTS

| | | | |
|---|---|---|---|
| CN | 101056557 | B | 1/2011 |
| DE | 8610640 | U1 | 6/1986 |
| DE | 8714843 | U1 | 2/1988 |
| EP | 0465810 | A1 | 1/1992 |
| EP | 1086681 | A1 | 3/2001 |
| EP | 1 147 757 | A2 | 10/2001 |
| EP | 1 621 173 | A2 | 2/2006 |
| EP | 1793706 | B1 | 7/2008 |
| GB | 183181 | A | 7/1922 |
| GB | 189572 | A | 12/1922 |
| JP | 11 221134 | A | 10/1999 |
| WO | WO 97/05845 | A1 | 2/1997 |
| WO | WO 98/04170 | A | 2/1998 |
| WO | WO 2004/060257 | A2 | 7/2004 |
| WO | WO 2006/036523 | A1 | 4/2006 |
| WO | WO 2007/021878 | A2 | 2/2007 |
| WO | WO 2013/192411 | A2 | 12/2013 |

OTHER PUBLICATIONS

Oct. 30, 2009—(WO) Written Opinion—App. No. PCT/US09/03811.

Jan. 5, 2011—(WO) IPRP—App. No. PCT/US09/03811.

Stryker, Isoflex Sleep Surface, 2005.

Geltec, Redux Tri-Zone Pressure/Shear Support Surface, at least as early as 2006.

Brochure for ROHO Dry Floatation Mattress System.

Information and photographs of a Vitalgo Standing Bed, at least as early as 2011.

International Search Report and Written Opinion for related International Patent Application No. PCT/US2015/049391 dated Jan. 20, 2016.

* cited by examiner

BED WITH FRAME ASSEMBLY

CROSS-REFERENCE TO RELATED APPLICATIONS

This application is a continuation of U.S. patent application Ser. No. 16/118,015, filed on Aug. 30, 2018, which will issue as U.S. Pat. No. 10,617,582 on Apr. 14, 2020, which is continuation of U.S. patent application Ser. No. 14/840,748, filed on Aug. 31, 2015 and which issued as U.S. Pat. No. 10,064,771 on Sep. 4, 2018, which is a continuation of U.S. patent application Ser. No. 12/459,207, filed on Jun. 26, 2009 and which issued as U.S. Pat. No. 9,119,753 on Sep. 1, 2015, which claims priority to U.S. Provisional Patent Application No. 61/133,267, filed on Jun. 27, 2008, all of which are expressly incorporated herein by reference.

FEDERALLY SPONSORED RESEARCH OR DEVELOPMENT

Not Applicable.

TECHNICAL FIELD

The present invention relates generally to a bed, and more specifically to a bed having a separate foot deck that translates rotationally and longitudinally from a standard bed orientation into a chair orientation.

BACKGROUND OF THE INVENTION

Hospital beds are well known in the art. While hospital beds according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention generally provides a hospital bed with a foot deck section that transitions from a generally horizontal position to a generally vertical position (i.e., a chair bed) while still having the bed close to the floor even when the foot deck is in a generally vertical position.

According to one embodiment, the bed has a frame and a deck operably supported by the frame. The deck has a head deck, an intermediate deck and a foot deck. The head deck is located adjacent a head end of the bed and the foot deck is located adjacent a foot end of the bed. The intermediate deck is located between the head deck and the foot deck.

According to another embodiment, a longitudinal gap in the deck is provided between the intermediate deck and the foot deck when the intermediate deck and the foot deck are in a generally horizontal position. The longitudinal gap has a gap length defined from an edge of the intermediate deck to an edge of the foot deck of greater than 20% of a length of the foot deck.

According to another embodiment, the foot deck section translates longitudinally and rotationally to transition from the generally horizontal position to the generally vertical position.

According to another embodiment, the patient support deck has a movable head deck section and a movable foot deck section. The head deck section is located adjacent a head end of the bed and the foot deck section is located adjacent a foot end of the bed. The foot deck section transitions from the generally horizontal position to a generally vertical position to place the bed in a chair-bed configuration and to allow a user to exit the bed at the foot end of the bed. The bed also has a head end side rail operably connected to one of the frame and the head deck section, and a foot side rail operably connected to the foot deck section to assist the user when exiting out of the foot end of the bed.

According to another embodiment, the foot side rail rotates when the foot deck section transitions from the generally horizontal position to one of the plurality of angled positions.

According to another embodiment, the hospital bed has a foot end side rail rotatably connected to a shaft at one of the frame and the patient support deck to allow the foot end side rail to rotate about the shaft from a first position, where the side rail operates as a guard, to a second position.

According to another embodiment, an outer edge of the foot deck section adjacent the intermediate deck section is positioned above a plane of the intermediate deck section when the foot deck section is in the generally vertical position.

According to another embodiment, the foot deck has a first edge proximal the intermediate deck and a second edge distal the intermediate deck. After the foot deck transitions from a first generally horizontal position to a second generally vertical position, the second edge of the foot deck is positioned at least 120 millimeters from the floor when the seat deck is positioned no greater than nineteen inches from the floor.

According to another embodiment, the bed has a controller that controls the actuator to raise and lower the frame. The controller is configured to control the actuator to lower the frame to a first frame position when the foot deck is in the generally horizontal position, and to control the actuator to lower the frame to a second frame position when the foot deck is in the generally vertical position. The frame is closer to the floor in the first frame position than in the second frame position. Further, the controller precludes the frame from moving to the first frame position when the foot deck is in the generally vertical position.

According to another embodiment, the bed has a transverse foot board. The foot board is connected to the patient support deck at a foot end of the bed in a first position, and is connected to the frame adjacent a head end of the bed in a second position.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
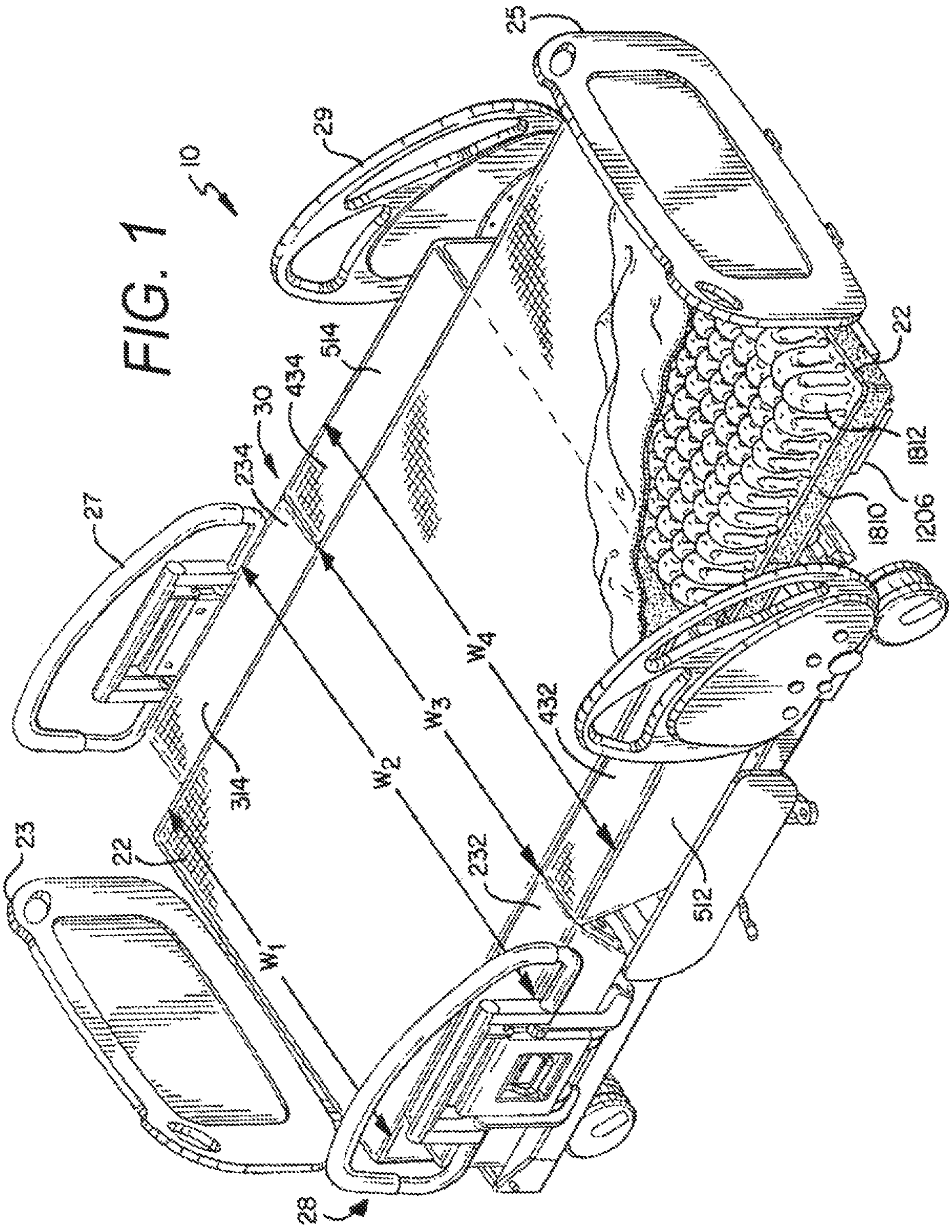
FIG. 1 is a perspective view of one embodiment of a hospital bed in a lower horizontal position and with side rails in the raised position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to the Figures, there are shown various embodiments of a hospital bed 10. The term "bed" herein is used to denote any embodiment of a support for a patient. As such, in different embodiments the "bed" is provided as an expandable width bed 10 as shown for example in FIG. 1, a chair bed 10 as shown for example in FIG. 5, a stretcher or gurney (not shown), or a variety of other embodiments, etc. In the chair bed embodiment the bed is manipulated to achieve both a conventional bed position having a generally horizontal patient support or sleeping surface upon which a user lies in a supine position, and a sitting position wherein the foot deck of the bed is provided in a generally vertical position such that the user's feet can be positioned on or adjacent the floor and the back of the user is supported by a raised back support. In the expanding width bed configuration the bed 10 is manipulated to convert to a wider patient support surface at various sections of the bed 10. The width of the expanding width bed 10 may be narrowed, however, to that of a conventional hospital bed to provide for ease of mobility of the bed 10. Additionally, in one embodiment the bed 10 is a bariatric bed, meaning it is provided to support morbidly obese patients.

Figure 15:
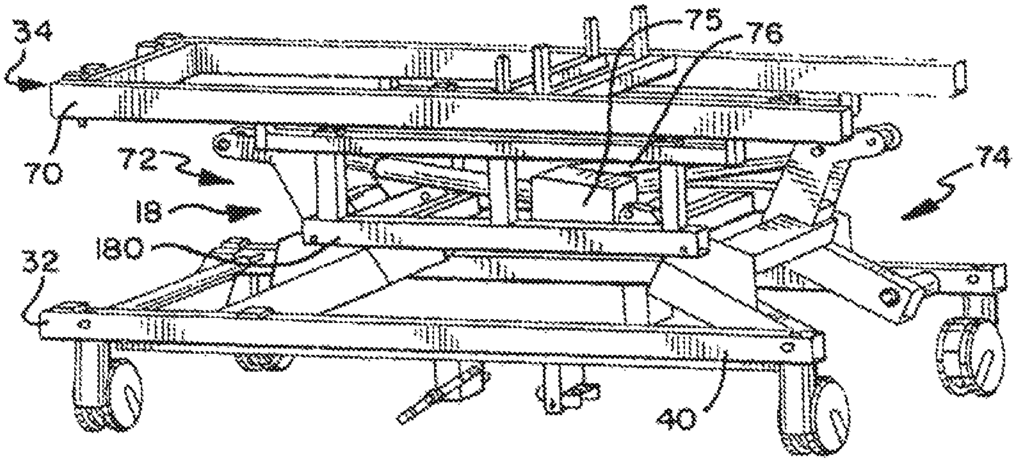
FIG. 15 is a perspective view of the frame assemblies of one embodiment of the hospital bed in a raised position.
Figure 19:
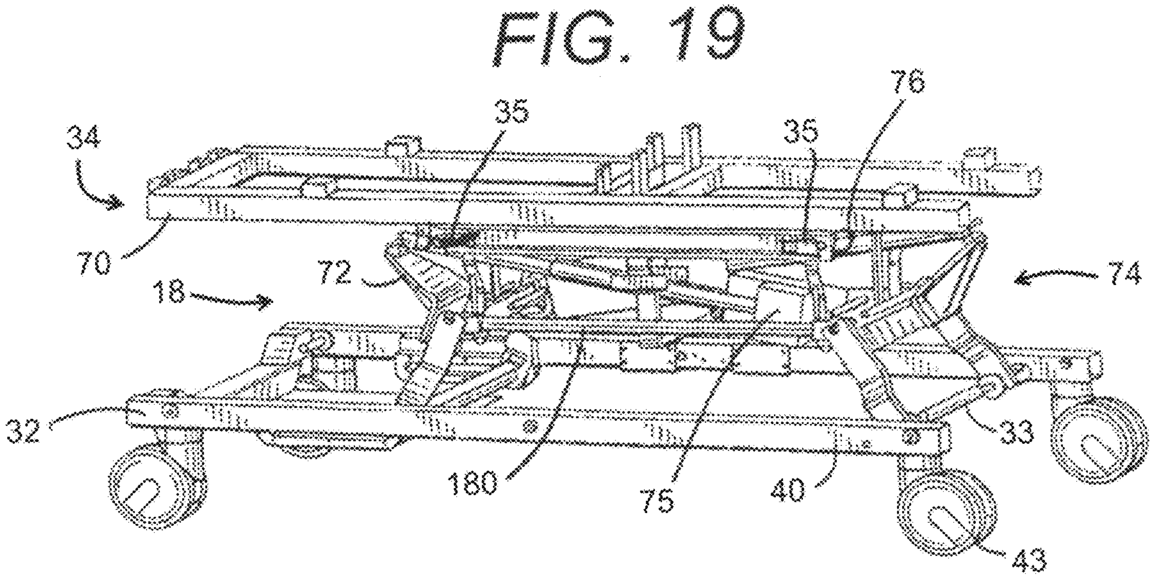
FIG. 19 is a perspective view of frame assemblies of another embodiment of the hospital bed in a raised position; and, FIG. 20 is an end view of the frame assemblies of the embodiment shown in FIG. 19.

The bed 10 generally comprises a base frame assembly 32, an intermediate frame assembly 18, a weigh frame assembly 34 and a patient support assembly 19 (see generally the embodiments of FIGS. 15 and 19). In various embodiments, the base frame assembly 32 has a plurality of actuators that raise and lower the intermediate frame assembly 18. The weigh frame assembly 34 is coupled to the intermediate frame assembly 18 by a plurality of load cells or load beams. Similarly, the patient support assembly 19 is coupled to the weigh frame assembly 34 by a plurality of actuators that raise and lower the different sections of the bed 10 (i.e., a head section, an intermediate or seat section, and a foot section), typically at various angular orientations.

The patient support assembly 19 preferably comprises a support deck assembly 20 and a mattress 22, however, either component may be identified as the patient support. The patient support assembly 19 may also include a patient support extension assembly, also referred to as a deck extension assembly. Various embodiments of patient support extension assemblies are described in detail in U.S. application Ser. Nos. 11/224,668; 11/224,669; 11/224,739; and, 11/224,691.

The mattress 22 may be a foam mattress, closed air-cell mattress, inflatable mattress, low-air loss mattress, fluidized mattress, percussion mattress, rotation mattress or any other type of mattress known in the art, including a mattress made of a combination of the aforementioned. As explained above, in one embodiment the patient support assembly 19 is connected to the weigh frame assembly 34, and the weigh frame assembly 34 is connected to the intermediate frame assembly 18 via load cells.

In a preferred embodiment the bed 10 will be capable of transitioning to a chair orientation and to an expanded width orientation. The bed 10 has a head end 24, a foot end 26 opposing the head end 24, a first side 28 and a second side 30 opposing the first side 28. The term "head end" is used to denote the end of any referred to object that is positioned nearest the head end 24 of the bed 10, and the term "foot end" is used to denote the end of any referred to object that is positioned nearest the foot end 26 of the bed 10.

Figure 2:
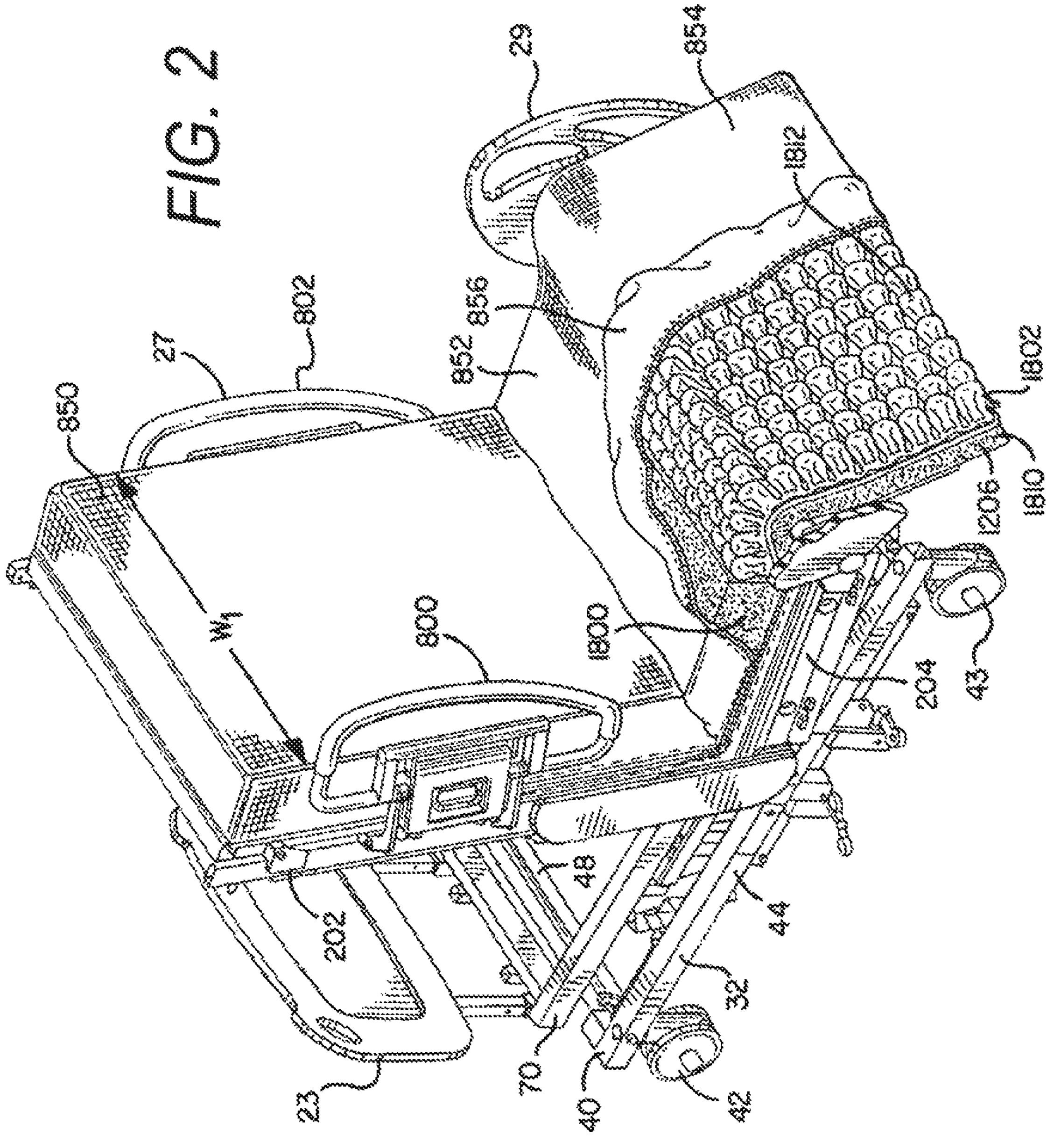
FIG. 2 is a perspective view of one embodiment of a hospital chair-bed in the chair bed position.

The bed 10 also has a headboard 23 and a footboard 25. In one embodiment, the headboard 23, as shown in FIG. 2 is generally connected to the weigh frame 70 of the weigh frame assembly 34. The headboard 23 is generally provided at the very head end 24 of the bed 10. In a preferred embodiment the footboard 25, as shown in FIGS. 1 and 13-15, is removably connected adjacent the foot end 26 of the bed 10 in a first position, and adjacent the head end 24 of the bed 10 in a second position. Preferably, the footboard 25 is connected to the foot deck section 1206 of the patient support assembly 19.

Figure 3:
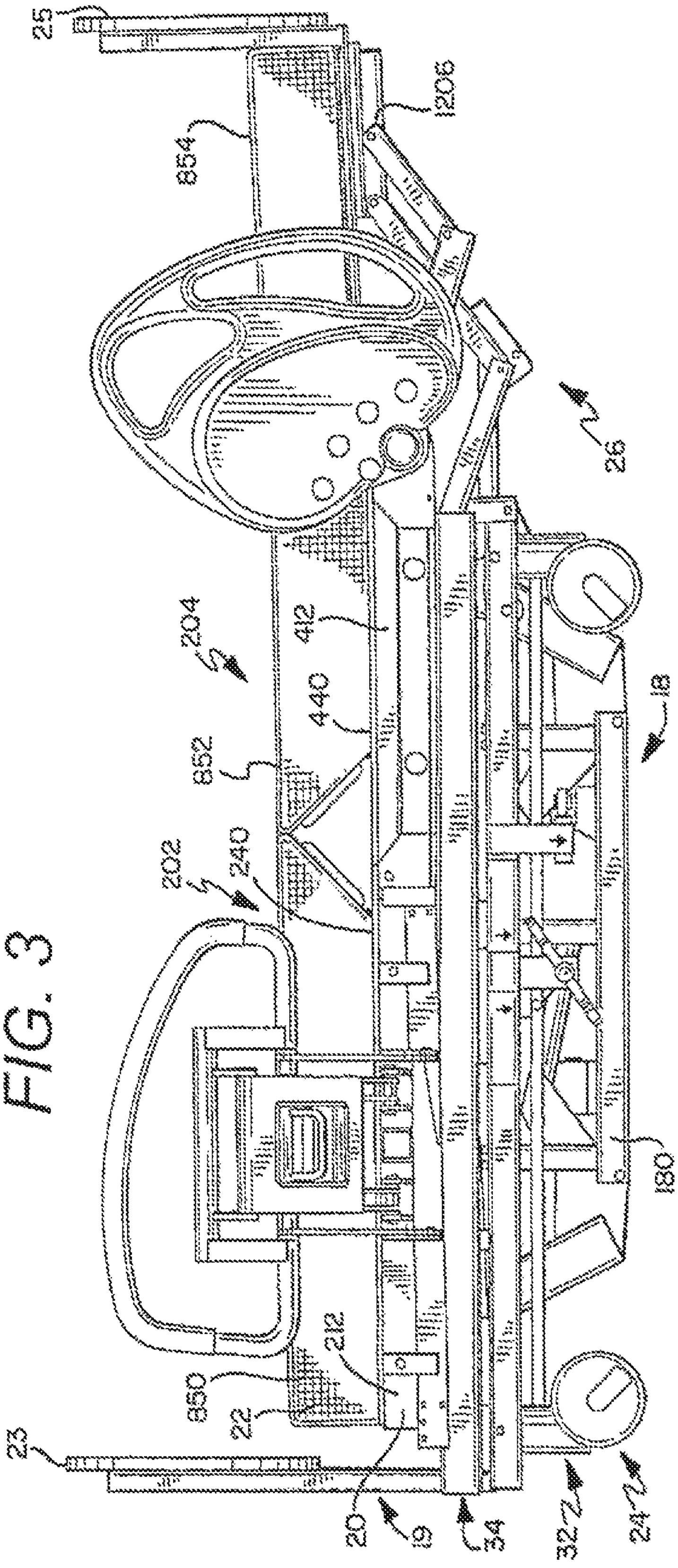
FIG. 3 is a side view of the hospital bed of FIG. 1 in the lower horizontal position.
Figure 4:
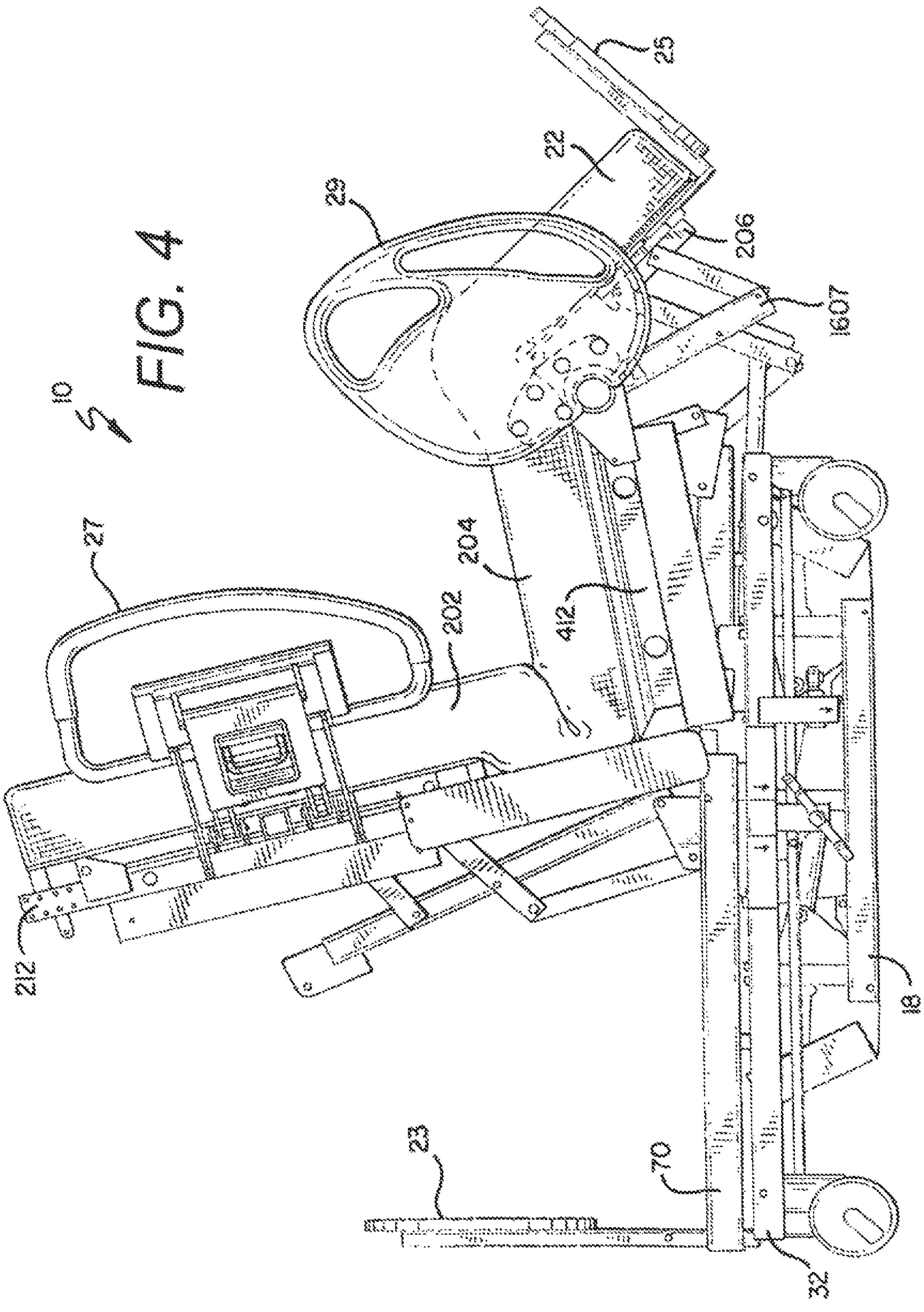
FIG. 4 is a side view of the hospital bed of FIG. 1 in the cardiac chair position.
Figure 5:
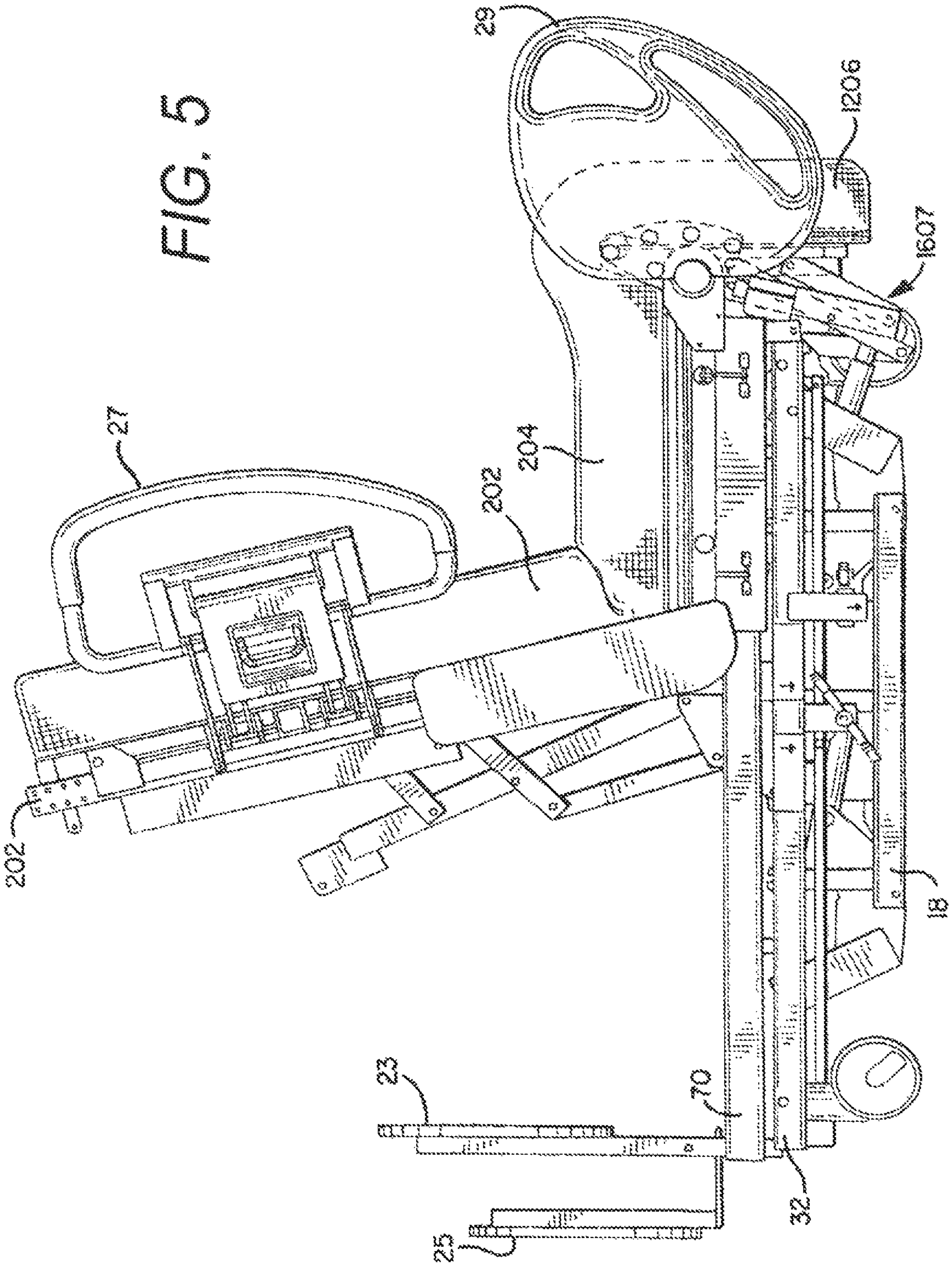
FIG. 5 is a side view of the hospital bed of FIG. 2 in the chair bed position.
Figure 20:
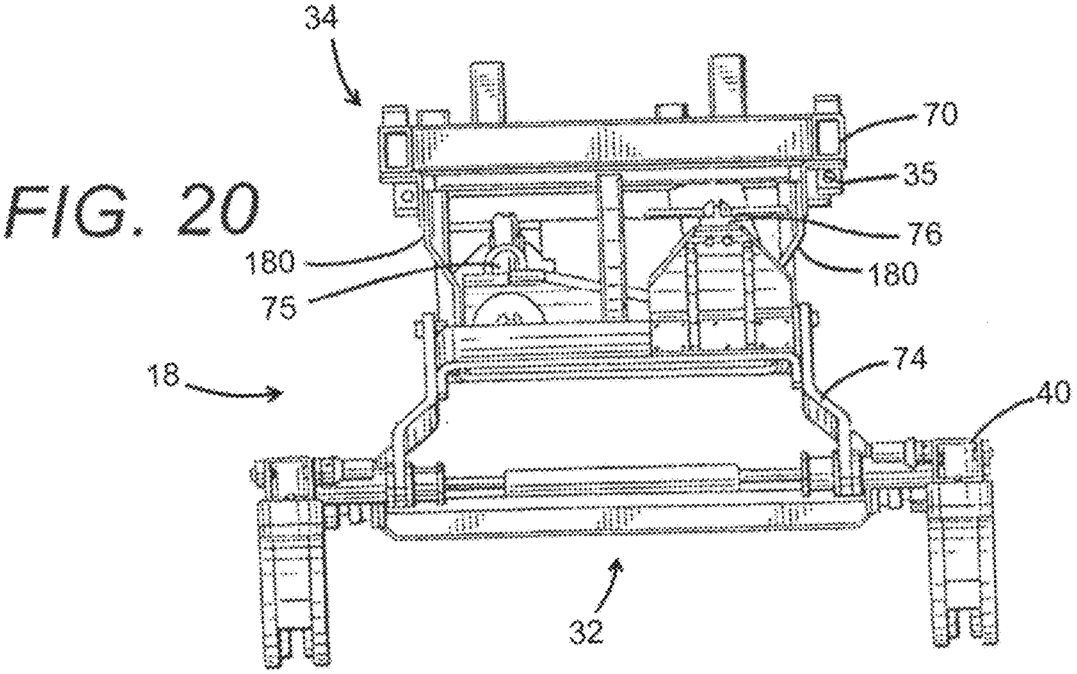

The bed 10 can assume a plurality of positions/orientations via manipulation of the intermediate frame assembly 18 [e.g., foot end 26 and head end 24 up (bed 10 in up position), foot end 26 and head end 24 down (bed 10 in lower position), foot end 26 up and head end 24 down (Trendelenburg position), and head end 24 up and foot end 26 down (reverse Trendelenburg position)], and the various deck sections (head deck section 202, intermediate or seat deck section 204 and foot deck section 1206) of the support deck assembly 20, as explained herein. For example, the bed 10 can assume a standard bed position such that the support deck assembly 20 is in the horizontal position as shown in FIGS. 1 and 3, the bed 10 can assume a chair orientation such as shown in FIG. 5, the bed 10 can assume a knee-gatch or cardiac-chair position such as shown in FIG. 4, and the bed 10 can assume a variety of positions therebetween. Additionally, as explained briefly above, the intermediate frame assembly 18 can be independently raised and lowered at the head end 24 and foot end 26 of the bed. Further, when the foot end 26 of the intermediate frame assembly 18 is raised and the head end 24 is in a lowered position the bed 10 can assume the Trendelenburg position; conversely, when the head end 24 of the intermediate frame assembly 18 is raised and the foot end 26 is in a lowered position the bed 10 can assume the reverse Trendelenburg position. Further, the entire intermediate frame assembly 18 can be raised simultaneously to assume a raised bed orientation, and the entire intermediate frame assembly 18 can be lowered simultaneously to assume a lowered bed orientation and a lowered chair-bed orientation. Movement of one type of base frame assembly 32 and intermediate frame assembly 18 is described in detail in U.S. application Ser. Nos. 11/224,668; 11/224,669; 11/224,739; and, 11/224,691, which are incorporated herein by reference and made a part hereof. An alternate preferred type of base frame assembly 32 and intermediate frame assembly 18, is shown in FIGS. 1-5 and 15-18 herein, wherein the intermediate frame assembly 18 is raised and lowered via internal arms and actuators connected to the base frame assembly 32 to allow the intermediate frame assembly 18 to nest within the base frame assembly 32 and thereby lower the bed 10 closer to the floor. Specifically, a first actuator 75 is provided to raise and lower the head end 24 of the intermediate frame assembly 18, and a second actuator 76 is provided to raise and lower the foot end 26 of the intermediate frame assembly 18. A further alternate type of base frame assembly 32 and intermediate frame assembly 18 is shown in FIGS. 19-20.

Figure 16:
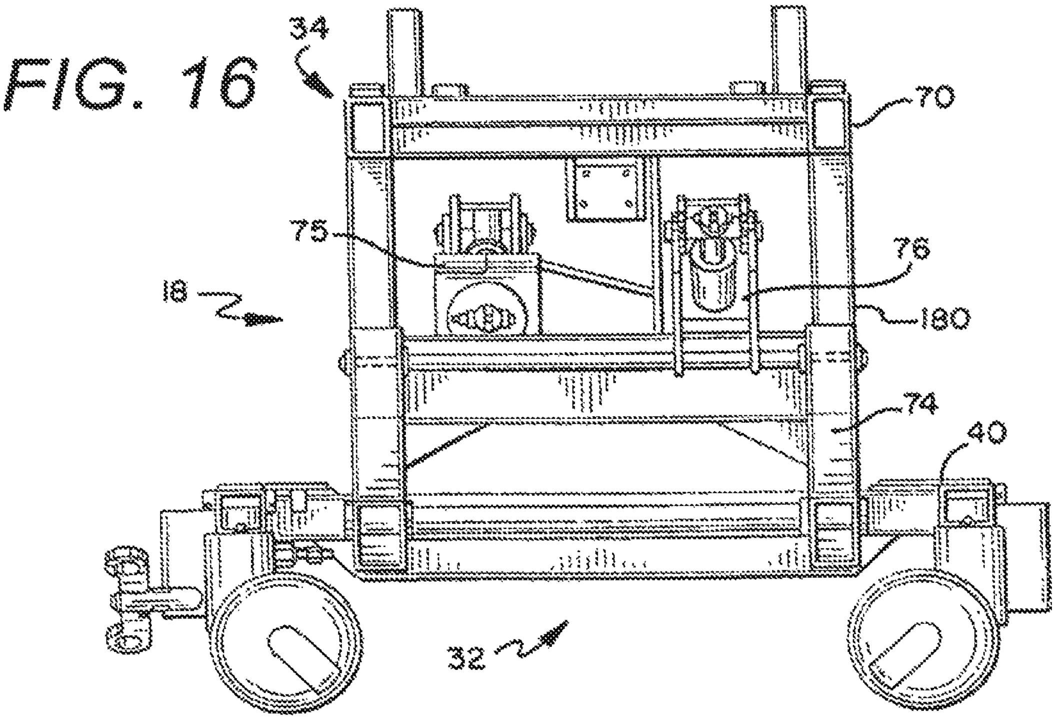
FIG. 16 is an end view of the frame assemblies of the embodiment shown in FIG. 15.
Figure 17:
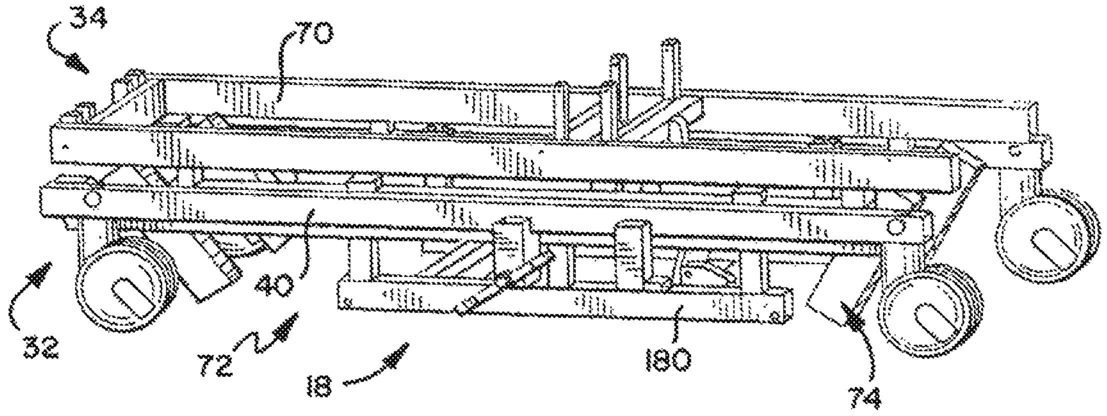
FIG. 17 is a perspective view of the frame assemblies of one embodiment of the hospital bed in a lowered position.
Figure 18:
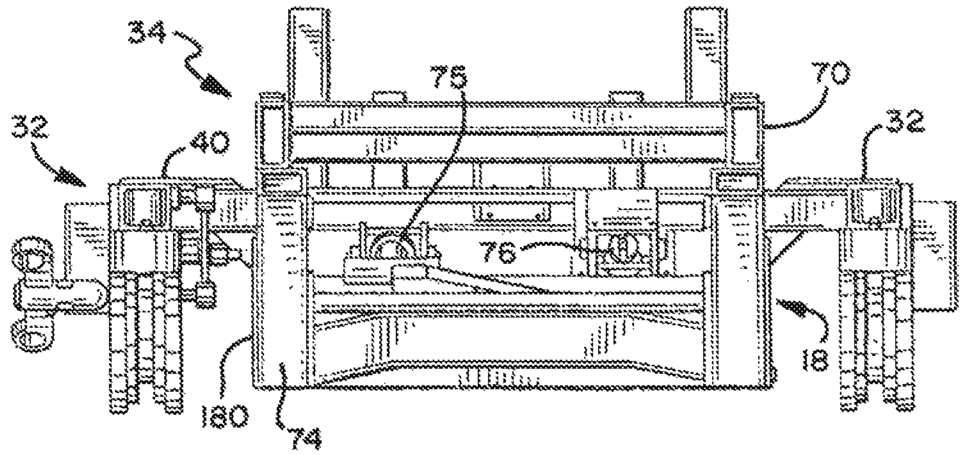
FIG. 18 is an end view of the frame assemblies of the embodiment shown in FIG. 17.

FIGS. 15-18 disclose two different positions of the intermediate frame assembly 18 and weigh frame assembly 34. Specifically, FIGS. 15 and 16 illustrate the intermediate frame assembly 18 and weigh frame assembly 34 in the raised position, and FIGS. 17 and 18 illustrate the intermediate frame assembly 18 and weigh frame assembly 34 in a lowered position. Similarly, FIGS. 19 and 20 illustrate another embodiment of the intermediate frame assembly 18 and weigh frame assembly 34 in the raised position.

In both embodiments a first arm assembly 72 connects the head end 24 of the intermediate frame assembly 18 with the weigh frame assembly 34, and it is also connected to the head end actuator 75. Similarly, a second arm assembly 74 connects the foot end 26 of the intermediate frame assembly 18 with the weigh frame assembly 34, and it is also connected to the foot end actuator 76. As shown in the end views of FIGS. 16 and 18, the arm assemblies 72, 74 reside generally inline with the intermediate frame 180, but the edge of the arm assemblies 72, 74 is somewhat interior of the exterior surface of the arm assemblies 72, 74. This configuration of the arm assemblies 72, 74, intermediate frame assembly 18 and base frame assembly 32 allows the intermediate frame assembly 18 to nest within the base frame assembly 32 in the lowered position as shown in FIG. 18. In such a lowered-most position, the intermediate frame assembly 18 is provided at, or just above, the threshold position, and portions of the intermediate frame assembly 18 are lower than portions of the base frame assembly 32.

In a preferred positioning, when the bed 10 is placed in the chair orientation the intermediate frame assembly 18 is in a lowered position, thereby allowing the patient to easily exit the foot end 26 of the chair bed 12. In the lowered chair bed position the deck plate of the seat deck section 204 is less than 20" from the floor, preferably approximately less than 18" from the floor, more preferably approximately less than 17.5" from the floor, and is most preferably approximately 17" from the floor. Moreover, it is preferred that in the chair orientation, the deck plate of the intermediate or seat section 204 is positioned no greater than 18" from the floor. This can be accomplished in the present invention because the foot deck section 1206 has a short length, and because a longitudinal gap 1205 is provided between the seat deck section 204 and the foot deck section 1206 (shown in FIGS. 6A-6C). The size of the longitudinal gap 1205 is decreased or eliminated as the foot deck section 1206 transitions from the generally horizontal bed position to the chair position. Accordingly, the seat of the present chair bed is able to be positioned closer to the floor than many prior art chair beds, making it easier for the patient to exit out of the chair bed from the foot end 26 of the chair bed 10.

Moreover, it is understood that in the horizontal bed position, as shown in FIG. 3, the intermediate frame assembly 18 may be able to be positioned in even a lowered position than when in the chair orientation. Specifically, a controller controls the operation of the actuators in the bed 10 to raise and lower the frame assembly 18. The controller is configured to control the actuator to stop the intermediate frame assembly 18 at a first lowest frame position when the foot deck 1206 is in the substantially horizontal position, and the controller is configured to control the actuator to stop the intermediate frame assembly 18 at a second lowest frame position when the foot deck 1206 is in the substantially vertical position. The intermediate frame assembly 18 is actually closer to the floor in the first lowest frame position than in the second lowest frame position.

Additionally, in one embodiment, when the bed 10 is in the non-chair position, such as the horizontal position, and the deck extender assemblies (explained herein) are in the wide position, the bed 10, as operated by the controllers, may be positioned in an even lower position than the first lowest frame position. In such an orientation, the controller may actuate to lower the frame to a position that is just above threshold clearance. Accordingly, in one embodiment, in this position the deck plate of the intermediate or seat section 204 may be positioned approximately 14-16" from the floor.

The bed also has a plurality of siderail assemblies. The siderail assemblies generally provide a barrier that is moveable from a first position to a second position. In the first position the siderails assist in generally precluding a patient on the bed from rolling or falling off the bed (see FIG. 1). The siderails are moveable to the second position, however, to provide unfettered access to the patient on the bed for a caregiver or other individual to perform any procedures on the patient (not shown). In one embodiment two pairs of siderail assemblies are provided, a first pair of siderail assemblies 27 is provided toward the head end 24 of the bed, and a second pair of siderail assemblies 29 is provided toward the foot end 26 of the bed. Pairs of siderails are provided to impart barriers at both the first side 28 and second side 30 of the bed. The second pair of siderail assemblies 29 are mounted to shaft 1604*a*, 1604*b*, respectively, to allow the second pair of siderail assemblies 29 to rotate from the first position to the second position.

The base frame assembly 32 of the bed 10 generally comprises a base frame 40 and a plurality of casters 42, 43. The casters include a pair of casters 42 at the head end of the base frame assembly 32, and a pair of casters 43 at the foot end of the base frame assembly 32.

As best shown in FIGS. 1, 3 and 4, the base frame assembly 32, intermediate frame assembly 18, and weigh frame assembly 34 extend from the head end 24 of the bed 10 toward the foot end 26 of the bed 10. However, in one embodiment, these frame assemblies generally do not extend fully to the foot end 26 of the bed 10. Instead, as is explained in detail herein, these assemblies 32, 18, 34 generally end at the distal end of the seat deck section 204 of the patient support deck 20. Accordingly, the foot deck section 1206 extends beyond the foot 26 of the base frame assembly 32, intermediate frame assembly 18 and weigh frame assembly 34. Because the base frame assembly 32 does not extend to the endmost foot end 26 of the bed 10, the foot end casters 43 are spaced apart from the foot end 26 of the bed 10, at least when the bed 10 is in the horizontal position. The inward positioning of the foot end casters 43 closer to the center of gravity of the bed 10 assists in maximizing the maneuverability of the bed 10 in the steering condition. Further, the base frame 40 has two side frame members 44 connected with a cross member 48 at the head end 24 of the base frame assembly 32. In one embodiment, as shown in FIG. 15, there is no cross member at the foot end 26 of the base frame assembly 32. The absence of a cross member at the foot end 26 of the base frame assembly 32 of the bed 10 allows the foot deck assembly 1206 to retract further inward in the chair position. In an alternate embodiment as shown in FIG. 19, however, a cross member 33 is provided at the foot end 26 of the base frame assembly 32 of the bed 10 to provide additional rigidity to the base frame assembly 32. In this embodiment the location of the cross member 33 does not affect the ability of the foot deck assembly 1206 to fully retract.

The intermediate frame assembly 18 of one embodiment of the bed 10 is connected to the base frame assembly 32 with a plurality of actuators to raise and lower the intermediate frame assembly 18. Two embodiments and drives for the intermediate frame assembly 18 are disclosed herein. One embodiment of the intermediate frame assembly 18 is shown in FIGS. 15-18. In this embodiment the intermediate frame assembly 18 is made of a welded tubular frame assembly. Another embodiment of the intermediate frame assembly 18 is shown in FIGS. 19-20. In this embodiment the intermediate frame assembly 18 is weldment of a plurality of bent sheet metal components, such as 3/16" formed flat stock. The sheet metal embodiment of the intermediate frame assembly 18 allows for easier electrical access to the load cell assemblies 35.

The weigh frame assembly 34 is connected to the intermediate frame assembly 18 with a plurality of load beams. As partially shown in FIGS. 19 and 20, four separate load cell assemblies 35 extend from the top outer corner of the intermediate frame 180 to support the weigh frame assembly 34. In a preferred embodiment, the weigh frame assembly 34 and the patient support assembly 19 (i.e., the support deck assembly 20 and the mattress 22), including all actuators to actuate the patient support assembly 19, are all supported from the load cell assemblies. The load cell assemblies 35 include load cells that movably couple the weigh frame assembly 34 to the intermediate frame assembly 18. Each load cell includes a fixed portion and a sensing portion that is movable relative to the fixed portion. Each load cell assembly 35 also comprises a transducer connected to the sensing portion that provides an electrical signal in response to movement of the sensing portion relative to the fixed portion. The extent of the movement of the sensing portion depends upon the amount of weight supported by the load cells, and accordingly the electrical signal provided by the load cells varies in response to the weight supported by the weigh frame assembly 34.

The weigh frame assembly 34 generally comprises a weigh frame 70 and a plurality of actuators, including actuators to raise and lower the support deck assembly 20. Accordingly, the support deck assembly 20 is operably connected to the weigh frame assembly 34. In one embodiment of the bed 10, the support deck assembly 20 for the bed 10 comprises a plurality of different deck sections. For example, as shown in FIGS. 4 and 5, the support deck assembly 20 comprises a head deck section 202 adjacent the head end 24 of the bed 10, an intermediate or seat deck section 204, and a foot deck section 1206 adjacent the foot end 26 of the bed 10. These sections of the support deck assembly 20 generally comprise the main deck. The head deck section 202 may also be referred to as a first deck section, the intermediate or seat deck section 204 may also be referred to as a second deck section, and the foot deck section 1206 may also be referred to as a third deck section. The head deck section 202 is generally moveable from a generally horizontal position to a more vertical back-support position, and the foot deck section 1206 is moveable from a generally horizontal position to a generally vertical position. The seat deck section 204 is positioned between the head deck section 202 and the foot deck section 1206. The seat deck section 204 is pivotably connected to the weigh frame 70, such that the seat deck section 204 can pivot upwardly to allow the bed 10 to attain a knee-gatch or cardiac chair position.

The head deck section 202 is preferably manipulated by a plurality of linkages. In one embodiment such a linkage system is a six bar linkage. Such a linkage simultaneously manipulates the head deck section 202 both angularly upward from the weigh frame 70 as well as toward the foot end 26 of the bed 10 (i.e., on top of the seat section 204). Similarly, as the head deck section 202 is lowered, the head deck section 202 is manipulated simultaneously both angularly downward toward the weigh frame 70 as well as toward the head end 24 of the bed 10. The desired result of such movement is that the top surface of the mattress 22 remains a substantially constant length, thereby resulting in decreased shear observed by a patient resting on the bed 10. The head deck section 202 can pivot from approximately 0° in the horizontal position, to approximately 80° in the more vertical back-support position.

Referring to FIG. 4, the seat deck section 204 is pivotally connected to the weigh frame 70. The seat actuator adjusts the angle of the seat deck 204 with respect to the frame. In one embodiment the pivot range of the seat deck section 204 is from approximately 0° in the horizontal to approximately 15° in the knee-gatch position. In a preferred embodiment the length of the seat deck section 204 is a fixed length. In one embodiment the actuator for the seat deck 204 raises the seat deck 204 upon a pulling action by the actuator.

In one embodiment of the bed 10, the foot end 26 of the seat deck section 204 is pivotally raised and lowered. To pivotally raise the foot end 26 of the seat deck section 204 the seat deck section actuator 184 exerts a first force on the seat deck section 204. To lower the seat deck section 204 the seat deck section actuator 184 correspondingly exerts an opposite force on the seat deck section 204. Accordingly, the seat deck section 204 is moveable from a generally horizontal position, as shown in FIG. 3, to an angularly raised position with respect to the weigh frame 70, also known as a knee-gatch position, as shown in FIG. 4.

Figure 7B:
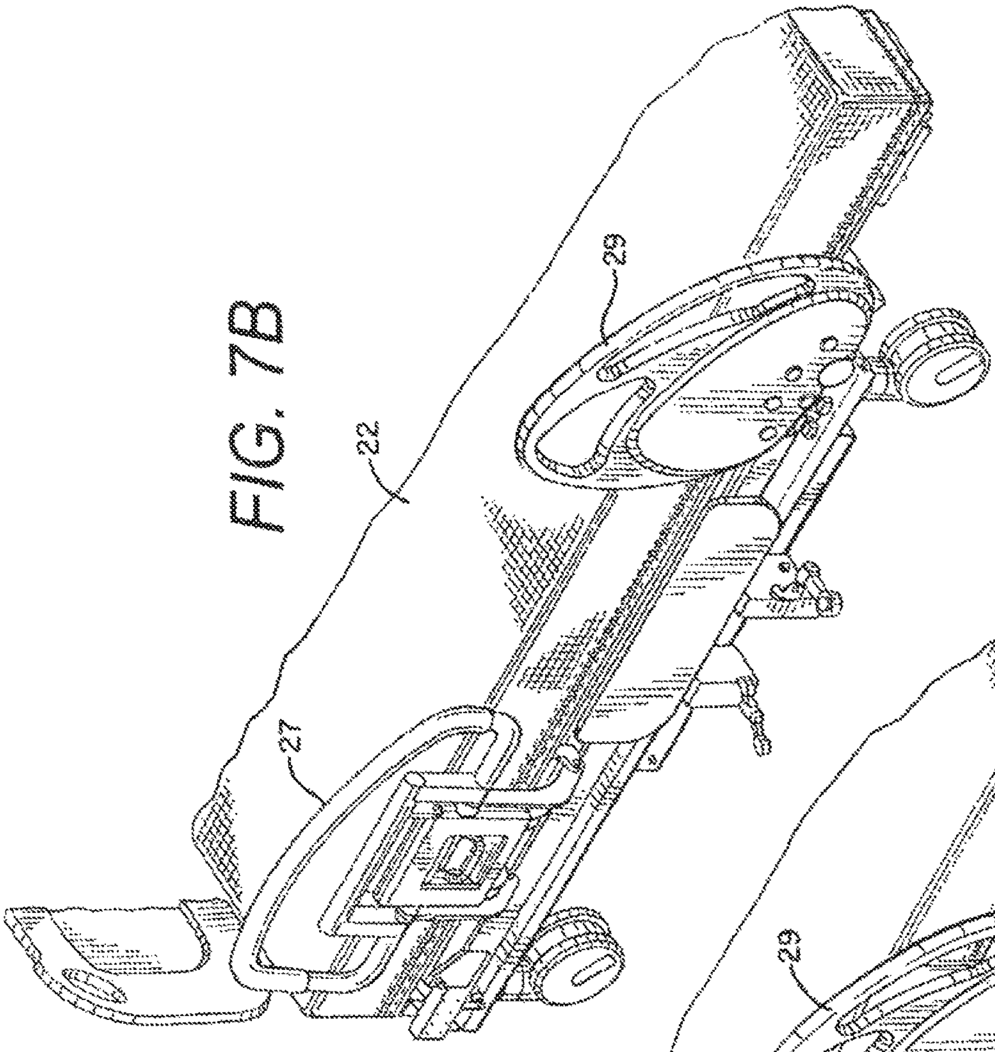
FIG. 7B is a partial perspective view of the hospital bed of FIG. 7A with the extension mechanisms in the retracted position.
Figure 7A:
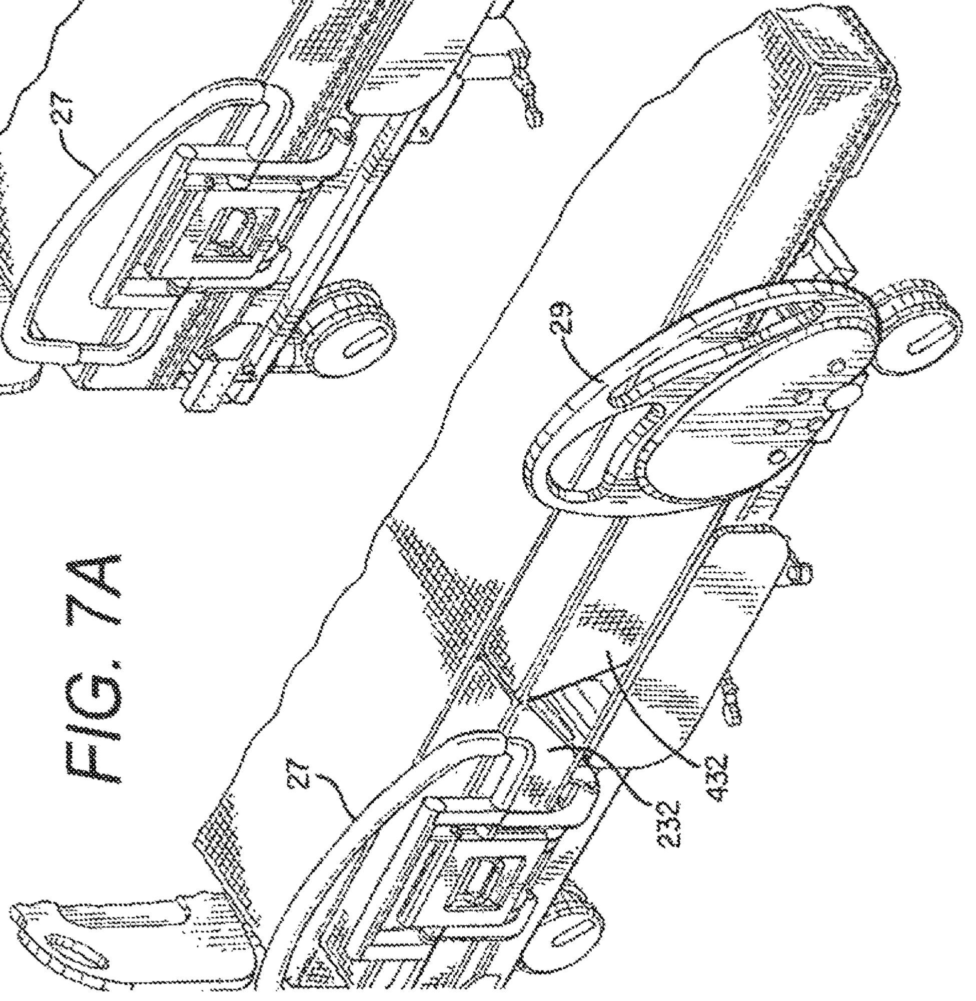
FIG. 7A is a partial perspective view of one embodiment of a hospital bed having an extension mechanism at the head and seat sections for expanding the width of the bed.

As shown in FIGS. 1, 7A and 7B, in one embodiment of the bed 10 the head deck section 202 generally comprises a head frame assembly 212 and a head deck plate 240. Additionally, in one embodiment wherein the bed 10 has a variable width component, the head deck section 202 also comprises a first side head deck extender assembly 232 and a second side head deck extender assembly 234. The deck extender assemblies are also referred to as patient support extension assemblies. The first side head deck extender assembly 232 is utilized to increase the width of the bed at the first side 28 of the bed 10, and the second side head deck extender assembly 234 is utilized to increase the width of the bed at the second side 30 of the bed 10.

The first and second side head deck extender assemblies 232, 234 are independently moveable from a first retracted position (see FIG. 2) to a second expanded position (see FIG. 1). Similarly, the supplemental mattresses on the first and second side head deck extender assemblies 232, 234 are thus repositioned from a first retracted position (see FIG. 2) to a second expanded position (see FIG. 1). In one embodiment the distance from the centerline of the bed 10 to an edge of the mattress 22 is identified as distance $W_1$, and the distance from the centerline of the bed 10 to an edge of the supplemental mattress after the supplemental mattress is in the second expanded position is identified as distance $W_2$, where $W_2$ is greater than $W_1$. In a preferred embodiment, the width of the supplemental mattress is approximately 5 inches, and thus the distance from $W_1$ to $W_2$ is approximately 5 inches. In one embodiment, in the retracted or non-deployed position the deck extender assemblies 232, 234 are generally underneath the deck plate 240.

As briefly explained above, in a preferred embodiment each of the deck extender assemblies 232, 234 also has a supplemental mattress assembly connected thereto for extending the patient support surface of the bed. In a preferred embodiment, a first side supplemental mattress assembly 312 is provided for the first side head deck extender assembly 232, and a second side supplemental mattress assembly 314 is provided for the second side head deck extender assembly 234 to increase the width of the surface supporting the patient. In a preferred embodiment, the width of the supplemental mattress is adapted to increase the width of the mattress of the bed approximately 5" per side, for a total mattress width increase of 10".

In one embodiment of the bed 10 the seat deck section 204 generally comprises a seat frame assembly 412 and a seat deck plate 440. Additionally, in one embodiment wherein the bed has a variable width component, like the head deck section 202, the seat deck section 204 also comprises a first side seat deck extender assembly 432 and a second side seat deck extender assembly 434. The first side seat deck extender assembly 432 is utilized to increase the width of the bed at the first side 28 of the bed 10, and the second side head seat extender assembly 434 is utilized to increase the width of the bed at the second side 30 of the bed 10. The deck extender assemblies 432, 434 are connected to the seat deck section 204 and allowed to move relative thereto.

Like the first and second side head deck extender assemblies 232, 234, the first and second side seat deck extender assemblies 432, 434 are also independently moveable from a first retracted position to a second expanded position. Similarly, the supplemental mattresses on the first and second side seat deck extender assemblies 432, 434 are thus repositioned from a first retracted position (see FIG. 2) to a second expanded position (see FIG. 1). In one embodiment, the distance from the centerline of the bed 10 to an edge of the mattress 22 at the seat section is identified as distance $W_3$, and the distance from the centerline of the bed 10 to an edge of the supplemental mattress after the supplemental mattress is in the second expanded position at the seat deck section is identified as distance $W_4$, where $W_4$ is greater than $W_3$. In a preferred embodiment, the width of the supplemental mattress is approximately 5 inches, and thus the distance from $W_3$ to $W_4$ is approximately 5 inches.

In a preferred embodiment each of the deck extender assemblies 432, 434 also has a supplemental mattress assembly connected thereto for extending the patient support surface of the bed. In a preferred embodiment, a first side supplemental mattress assembly 512 is provided for the first side seat deck extender assembly 432, and a second side supplemental mattress assembly 514 is provided for the second side seat deck extender assembly 434. Like the head deck extender assemblies, in the retracted or non-deployed position, the seat deck extender assemblies 432, 434 are generally underneath the seat deck plate 440.

It is understood that in a preferred embodiment the deck extender assemblies operate completely independently. Accordingly, any deck extender assembly of the bed may be in the retracted or non-deployed position, the partially deployed position, or the expanded or deployed position at any time, irrespective of any other deck extender assembly.

As shown in the Figures, the support deck assembly 20 of the patient support assembly 19 also comprises a foot deck section 1206. In one embodiment the foot deck assembly 1206 does not have a deck extender assembly, but in an alternate embodiment a foot deck extender assembly is possible and within the scope of the present invention.

Figure 6A:
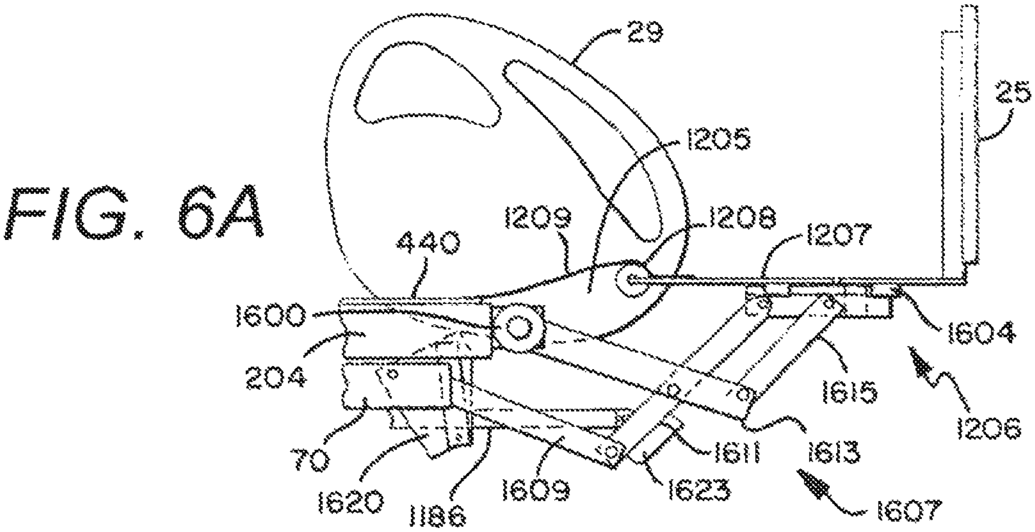
FIG. 6A is a partial side view of the foot deck section of one embodiment of the hospital bed in the horizontal bed position.
Figure 6B:
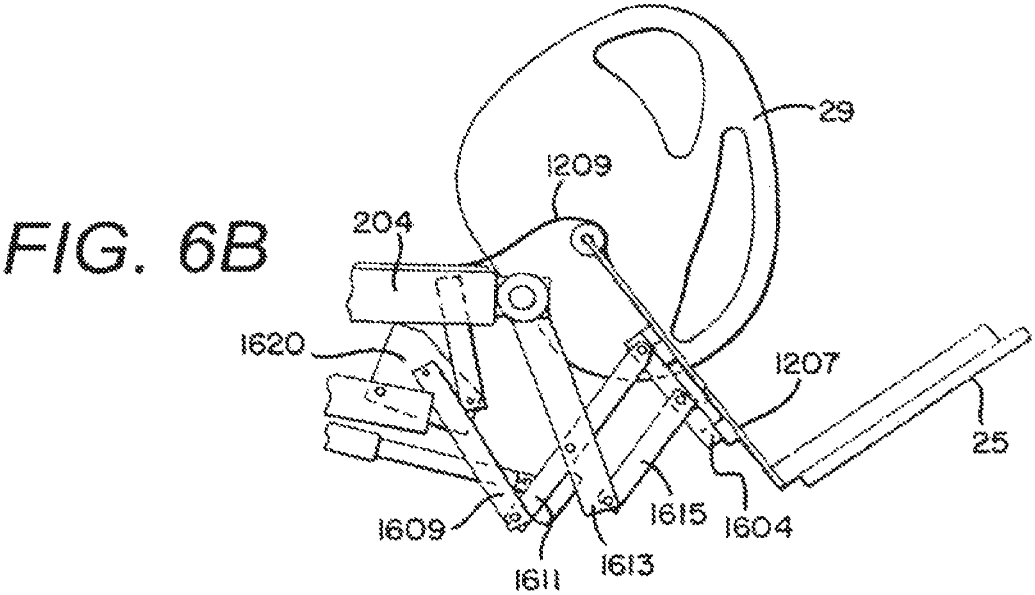
FIG. 6B is a partial side view of the foot deck section of FIG. 6A, shown in the transition to the chair bed position.
Figure 6C:
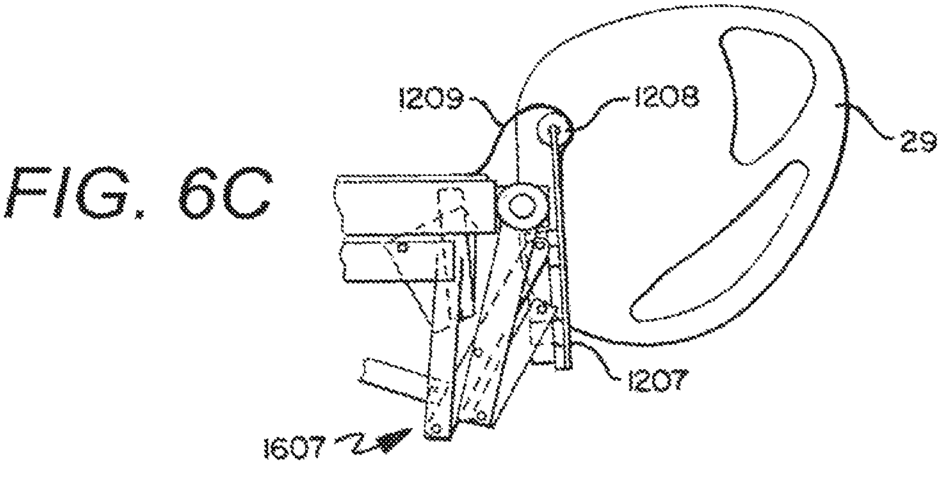
FIG. 6C is a partial side view of the foot deck section of FIG. 6A, shown in the chair bed position.
Figure 8:
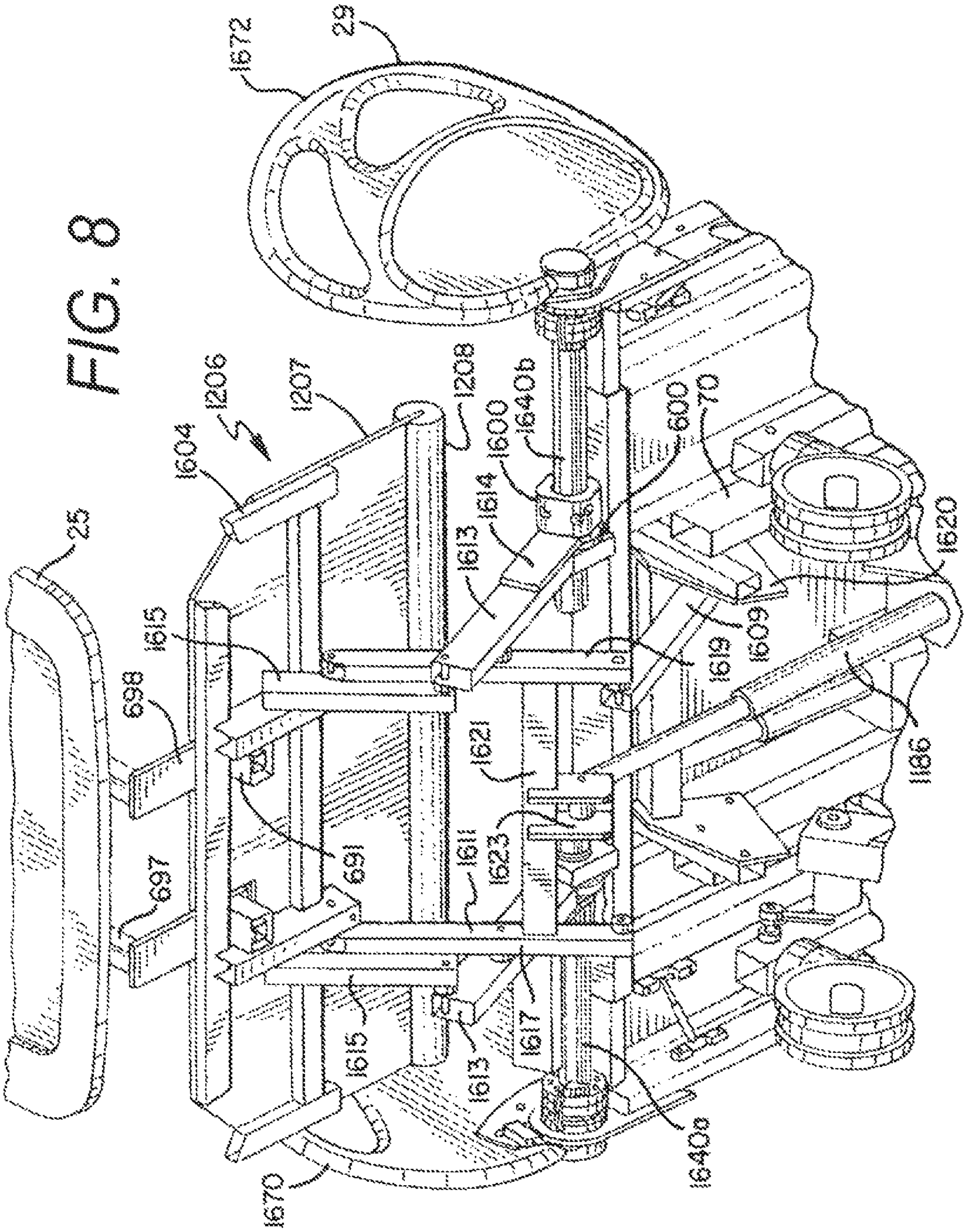
FIG. 8 is a bottom perspective view of one embodiment of the actuation mechanism for the foot deck of the hospital bed.

In a preferred embodiment, the foot deck section 1206 is operably connected to the weigh frame 70 of the weigh frame assembly 34. In one embodiment, as best shown in FIG. 8, the foot deck section 1206 includes a foot deck frame 1604 and foot deck plate 1207. In the embodiment illustrated, the foot deck frame 1604 is a metal weldment made of rectangular tubing, however, one of ordinary skill in the art would readily understand that any size or shape tubing, bar stock, round stock, bent flat stock, etc. is acceptable and would perform adequately without departing from the scope and spirit of the present invention. The foot deck plate 1207 is connected to the foot deck frame 1604, and the foot end of the mattress 22 is positioned on the foot deck plate 1207. In one embodiment, as shown in FIGS. 6A-6C, the foot deck plate 1207 extends longitudinally beyond the foot deck frame 1604 toward the head end 24 of the bed 10. Specifically, in one embodiment the foot deck plate 1207 extends toward the seat deck section 204 beyond the edge of the foot deck frame 1604. In a preferred embodiment the foot deck plate 1207 is approximately 15" in length longitudinally from the head end of the foot deck plate 1207 to the foot end of the foot deck plate 1207, whereas the longitudinal length of the foot deck frame 1604 is approximately 7".

Additionally, in one embodiment the foot deck plate 1207 has an enlarged rounded member 1208 at the head-end edge of the foot deck plate 1207 adjacent the gap 1205 between the foot deck section 1206 and the seat deck section 204. The enlarged rounded member 1208 may be a foam member that softens the edge of the foot deck plate 1207 when the foot deck section 1206 is in the substantially vertical position, as shown in FIG. 6C. In a preferred embodiment the diameter of the rounded member 1208 is approximately 2".

Additionally, as shown in FIG. 6A, in one embodiment when the foot deck section 1206 is positioned in the generally horizontal position, the plane of the foot deck plate 1207 is vertically offset from the plane of the seat deck plate 440, and in one embodiment the foot deck plate 1207 is positioned in a vertical plane above the plane of the seat deck plate 440. In a preferred embodiment, the foot deck plate 1207 is positioned approximately 1" above seat deck plate 440. The offset distance is accounted for by the thickness of the mattress 22 at the various locations, as described in detail herein. Moreover, in a preferred embodiment, when the foot deck section 1206 is positioned in the substantially vertical position as shown in FIG. 6C, the top of the rounded member 1208 is approximately 3.5" above the seat deck plate 440.

The foot deck section 1206 is operably connected to the weigh frame assembly 34 and the seat deck section 204 with a non-pivotal actuation mechanism 1607 that is driven by a foot deck actuator 1186. Accordingly, the foot deck section 1206 is not directly connected to the seat deck section 204, as is typical in most hospital beds. The foot deck actuator 1186 is also fixed to the weigh frame assembly 34. In a preferred embodiment the non-pivotal actuation mechanism 1607 simultaneously rotates and longitudinally translates the foot deck section 1206 from the generally horizontal position as shown in FIG. 6A, to the substantially vertical position as shown in FIG. 6C. Further, in a most preferred embodiment the rotation of the foot deck section 1206 is about a moving pivot point. Accordingly, unlike prior art actuation mechanisms used with foot decks that are pivotally connected to either the frame or the seat assembly and that merely pivot the foot deck about the pivotal connection, the preferred actuation mechanism 1607 for the foot deck 1206 of this application simultaneously longitudinally translates and rotates the foot deck 1206 from the generally horizontal to the substantially vertical position. In one embodiment the actuation mechanism 1607 is connected to the foot deck a distance from the head end edge of the foot deck section 1206.

Additionally, as shown in FIGS. 6A-6C, in a preferred embodiment the foot deck section 1206 is provided a distance from the intermediate or seat deck section 204. Accordingly, a longitudinal space or gap 1205 is provided between the seat deck section 204 and the foot deck section 1206 when the foot deck section 1206 is in the generally horizontal position. As the foot deck section 1206 transitions from the generally horizontal position to the substantially vertical position the length or size of the gap 1205 decreases due to the simultaneous translation and rotation of the foot deck 1206 from the generally horizontal to the substantially vertical position. In one embodiment the distance from the seat deck section 204 to the foot deck section 1206, i.e., the length of the gap 1205, is approximately 7". Accordingly, since the gap length is approximately 7", and since the foot deck plate's 1207 longitudinal length is approximately 15", the longitudinal length of the overall foot deck section 1206 is approximately 22". In one embodiment, the length of the gap 1205, extending from the intermediate deck 204 to the foot deck 1206, is greater than 20% of the length of the foot deck 1206. Further, the foot deck 1206 may have a 2-3" extension created by the transverse members 698 of the footboard 25, as is explained and shown herein. As is seen in the figures, in one embodiment the foot deck section 1206 is located outside the footprint of the base frame.

Herein, the term longitudinal is used to denote an orientation or distance from the head end 24 to the foot end 26 of the bed 10, and the term lateral is used to denote an orientation or distance from the first side 28 to the second side 30 of the bed 10.

In one embodiment a flexible bridge 1209 is provided to join the seat deck section 204 to the foot deck section 1206. The flexible bridge 1209 is preferably made of any flexible material, however, in one embodiment a coated vinyl is utilized. The flexible bridge 1209 is connected at one end to the seat deck section 204, and at the opposing end to the foot deck section 1206. As explained herein, the flexible bridge 1209 provides support for the mattress 22 at the area of the gap 1205 when the foot deck section 1206 is in the generally horizontal position. In an alternate preferred embodiment, a separate flexible bridge 1209 is not employed. Instead, a flexible bridge may be comprised by the lower or bottom portion of the mattress encasing 856 which is strapped to the various sections of the bed 10. Further alternately, no flexible bridge may be employed.

As best shown in FIGS. 6A, 6B, and 8, in a preferred embodiment the non-pivotal actuation mechanism 1607 comprises a six-bar linkage, however, alternate linkages, such as a four-bar linkage or other linkage types or mechanisms may be utilized without departing from the scope of the present invention. The non-pivotal actuation mechanism 1607 comprises first and second opposing links 1609 pivotally connected to the weigh frame 70 (the first link being adjacent the first side 28 of the bed 10, and the second link being adjacent the second side 30 of the bed 10), an H-frame member 1611, first and second opposing drive rails 1613 (the first drive rail being adjacent the first side 28 of the bed 10, and the second drive rail being adjacent the second side 30 of the bed 10), and first and second control rails 1615 (the first control rail being adjacent the first side 28 of the bed 10, and the second control rail being adjacent the second side 30 of the bed 10).

The H-frame member 1611 generally comprises a first side member 1617 adjacent the first side 28 of the bed 10 and a second opposing side member 1619 adjacent the second side 30 of the bed 10 connected to the first side member 1617 with a cross member 1621. In various embodiments, the side members 1617 and 1619 may have an offset portion thereto. A clevis 1623 extends from the cross member 1621. The piston of the foot deck actuator 1186 is connected to the clevis 1623 extending from the H-frame 1611 to fix the foot deck actuator 1186 to the foot deck section 1206 for actuating the foot deck section 1206. The H-frame 1611 is also rotatedly connected to the foot deck frame 1604. Specifically, the first and second side members 1617, 1619 are pivotally connected at their respective ends to the foot deck frame 1604. The connection of the foot deck actuator 1186 to the H-frame member 1611, and the connection of the H-frame member 1611 to the foot deck frame 1604 control the translational position of the foot deck 1206.

With respect to the first link 1609 of the non-pivotal actuation mechanism 1607, the first end of the first link 1609 is rotatably connected to a lift plate 1620 extending from the torque tube connected to the weigh frame 70, and the second end of the first link 1609 is rotatedly connected to the first side member 1617 of the H-frame 1611. Similarly, the first end of the second link 1609 (the second link being on the opposite side of the bed 10 as the first link) is rotatably connected to an opposing seat lift plate 1620 extending from the torque tube connected to the weigh frame 70, and the second end of the second link 1609 is rotatedly connected to the second side member 1619 of the H-frame 1611.

The first drive rail 1613 of the non-pivotal actuation mechanism 1607 is connected at a first end to one of the first coupling members 1600 to drive the first shaft 1640*a* for the first foot end siderail 1670 located at the first side 28 of the bed, and is further rotatedly connected at a second end to the first control rail 1615. Similarly, the second drive rail 1613 opposing the first drive rail 1613 of the non-pivotal actuation mechanism 1607 is connected at a first end to the other first coupling member 1600 to drive the second shaft 1640*b* for the second foot end siderail 1672 located at the second side 30 of the bed, and is further rotatedly connected at a second end to the second control rail 1615. Accordingly, as the foot deck actuator 1186 drives the foot deck section 1206, the foot deck siderails 1670, 1672 are simultaneously driven from their first position to their second position.

Figure 9A:
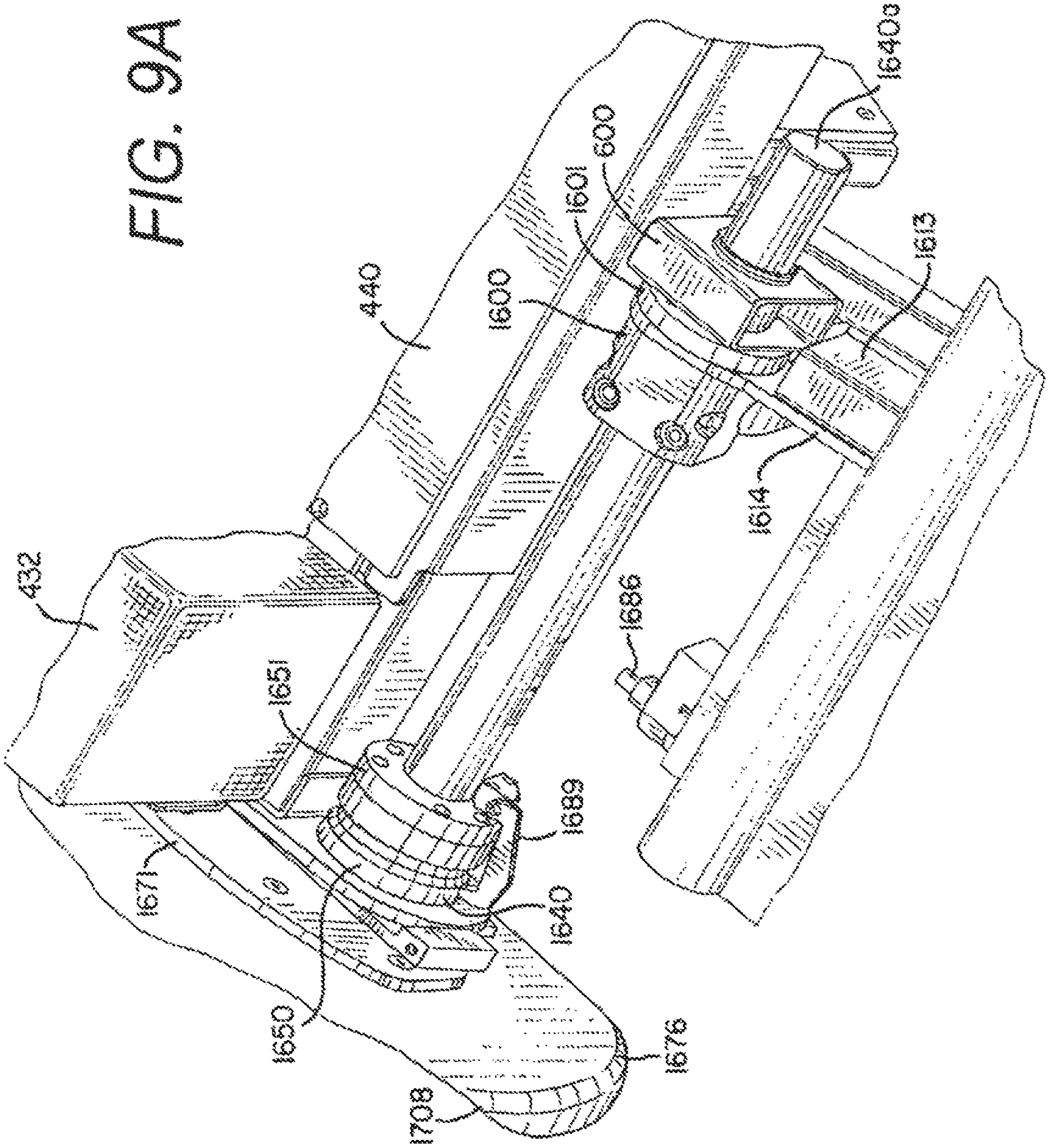
FIG. 9A is a partial perspective view of the actuation mechanism and interlock mechanism of FIG. 8 for the foot-deck side rail, with the foot-deck side rail in the extended position.
Figure 9B:
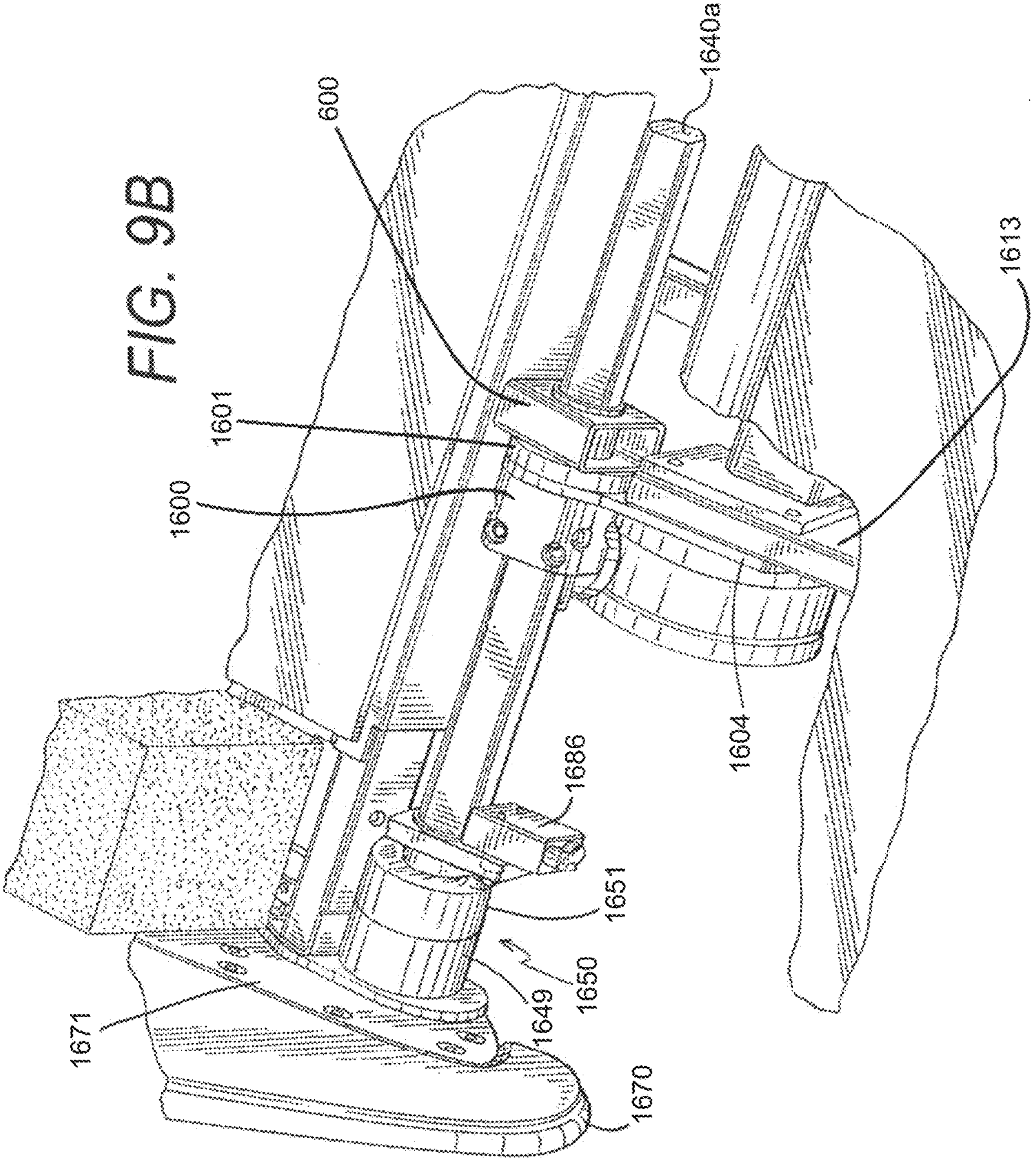
FIG. 9B is a partial perspective view of the actuation mechanism of FIG. 8 with an alternate interlock mechanism for the foot-deck side rail, with the foot-deck side rail in the extended position.

As shown in FIGS. 9A and 9B, in various embodiments the connection of the first drive rail 1613 to the first coupling member 1600 further comprises another coupling member 1601. An extension 1614 of the first drive rail 1613 is fixedly connected between coupling member 1600 and coupling member 1601. Further, as shown in FIGS. 9A and 9B, coupling member 1600 has a plurality of transverse pins therein to preclude rotational movement between coupling member 1601 and the appropriate shaft 1640*a* and 1640*b*, but which allows axial movement of the shafts 1640*a*, 1640*b*, respectively.

The first and second drive rails 1613 are also connected, respectively, to the H-frame member 1611 at a position between the ends of the first and second drive rails 1613. Specifically, the first drive rail 1613 is rotatedly connected to the first side member 1617 of the H-frame member 1611 at a location on the first side member 1617 between where the first link 1609 is rotatedly connected to the first side member 1617 and where the first side member 1617 is joined to the foot deck frame 1604. Similarly, the second drive rail 1613 is rotatedly connected to the second side member 1619 of the H-frame member 1611 at a location on the second side member 1619 between the second link 1609 is rotatedly connected to the second side member 1619 and where the second side member 1619 is joined to the foot deck frame 1604.

Finally, the first and second drive rails 1613 are connected, respectively, to the first and second control rails 1615. As explained above, the first control rail 1615 is adjacent the first side 28 of the bed 10, and the second control rail 1615 is adjacent the second side 30 of the bed 10. And, the end of the first control rail 1615 is pivotally connected to the foot deck frame 1604, and the end of the second control rail 1615 is pivotally connected to the foot deck frame 1604. The connection of the first and second control rails 1615 to the foot deck frame 1604 controls the angle of the foot deck assembly 1206 with respect to the H-frame 1611. As can be seen from FIGS. 6A-6C, in transitioning from the generally horizontal position to the generally vertical position, the foot deck section 1206 both rotates angularly downward and translates longitudinally backward toward the seat deck section 204. Similarly, in transitioning from the generally vertical position to the generally horizontal position the foot deck section 1206 translates longitudinally forward away from the seat deck section 204 and rotates angularly upward (i.e., transitioning from FIG. 6C to FIG. 6A). When the foot deck 1206 is in the generally vertical position the distal or foot end edge of the foot deck 1206 (when the foot board is removed) is preferably positioned at least 120 millimeters from the floor, and the seat deck is preferably positioned no greater than 19" from the floor in that position. Additionally, based on the configuration of the specific foot deck in the preferred embodiment, the mattress 22 on the bed 10 is at least ¾" above the floor. Similarly, in the chair position the top of the patient support surface (in this embodiment the mattress 22) is preferably no less than 25" from the floor.

As shown in FIG. 8, foot deck actuator 1186 manipulates the non-pivotal actuation mechanism 1607 which drives the drive rails 1613, respectively, to transition the first coupling members 1600 in a rotating manner (via the connection between the drive rails 1613 and the first coupling members 1600). As shown in FIGS. 9A and 9B, coupling members 1600 are fixedly connected to drive rails 1613, and also fixedly connected to the respective shaft 1640*a*, 1640*b* (as explained herein, axial movement of the shaft 1640*a*, 1640*b* within coupling members 1600 is provided, but rotational movement is precluded).

As shown in FIGS. 10A-10B and 11A-11B, weldments 600 have a bore which houses bearings (not shown) that rotatedly engage the outer surface of the first coupling members 1600. Such engagement allows the shafts 1640*a*, 1640*b* and the drive rails 1613 to rotate about the central axis of the weldments 600 in response to forces by the foot deck actuator 1186 on the foot deck frame 1604.

As shown in FIGS. 9A-9B and 10A-10B, in a preferred embodiment each of the shafts 1640*a*, 1640*b* has a cylindrical portion 1652 and two non-cylindrical portions 1653, 1654. The cylindrical portion 1652 of shafts 1640*a*, 1640*b* extends within a bore of the second coupling members 1650, respectively. The non-cylindrical portions 1653, 1654 may preferably have a hexagonal cross-sectional configuration, or a square cross-sectional configuration with chamfered corners to create a member with eight surfaces. As is explained herein, one non-cylindrical portion 1654 of the shaft 1640*a*, 1640*b* engages coupling member 1600 and is driven thereby because the coupling member 1600 is rotationally fixed to the shaft 1640*a*, 1640*b*. Accordingly, as the actuation mechanism for the foot deck 1206 translates and rotates, the drive rail 1613 rotates the coupling member 1600, which also rotates the foot siderail shaft 1640 via coupling member 1601. The shaft may, however, axially or laterally translate within the coupling member 1600, 1601.

The second coupling member 1650 comprises an outer coupling member 1649 and an inner coupling member 1651. In one embodiment as shown in FIGS. 9A-9B, 10A-10B and 11A-11B, the pair of second siderails 29 are connected to the outer portion 1649 of the second coupling member 1650. The outer portion 1649 of the second coupling member 1650 can detach from the inner portion 1651 of the second coupling member 1650 as explained herein, to allow the siderail 29 to independently rotate on the cylindrical portion of the shaft 1640*a*, 1640*b*. Accordingly, in this manner the second siderails 29 can rotate independently from the first position, wherein the siderail 29 is a barrier positioned above the top patient support surface, to the second position wherein the siderail 29 is moved generally below the top patient support surface.

The second pair of siderail assemblies 29 generally comprises a first foot end siderail 1670 located at the first side 28 of the bed, and a second foot end siderail 1672 at the second side 30 of the bed. In one embodiment, the foot end siderails 1670, 1672 are operably connected to the foot deck section 1206 of the bed and remain stationary relative to the foot deck section 1206 during movement of the foot deck section 1206 between the generally horizontal position and the generally vertical position. Referring to FIGS. 9A-9B, 10A-10B, and 11A-11B, in a preferred embodiment the first foot end siderail 1670 is operably connected to the first side shaft 1640*a*, and the second foot end siderail 1672 is operably connected to the second side shaft 1640*b*. The first and second foot end siderails 1670, 1672 are moveable from a first position (see FIG. 1), wherein they generally provide a barrier preventing the patient from unintentional exit off either of the sides 28, 30 of the bed, to a second position, wherein a barrier is not provided above the patient support surface. Each of the foot end siderails 1670, 1672 is independently moveable from the first position to the second position. Additionally, in one embodiment the foot end siderails 1670, 1672 are adapted to be fixed to the first position, wherein the foot end siderails 1670, 1672 remain stationary relative to the foot deck section 1206 during movement of the foot deck section 1206. A controller (not shown) for the bed may be connected to either or both of the siderails 1670, 1672, as described herein.

To provide for both fixed retaining of the siderails 1670, 1672 to the foot deck section 1206 and independent movement of the siderails 1670, 1672 relative to the foot deck section 1206, a locking assembly is provided. A first locking and sensor assembly is provided in FIGS. 9A, 10A and 11A, and a second locking and sensor assembly is provided in FIGS. 9B, 10B and 11B. The first locking assembly is moveable from an engaged state (shown in FIGS. 10A and 10B), wherein the siderail 1670, 1672 is fixed in the first position relative to the foot deck section 1206 and generally has at least a portion of the siderail barrier 1676 positioned above the patient support deck 20, and a disengaged state (shown in FIGS. 11A and 11B), wherein the siderail 1670, 1672 is free to rotate independent of the foot deck section 1206 and is moveable to a second position separate and apart from the foot deck section 1206.

Figure 10A:
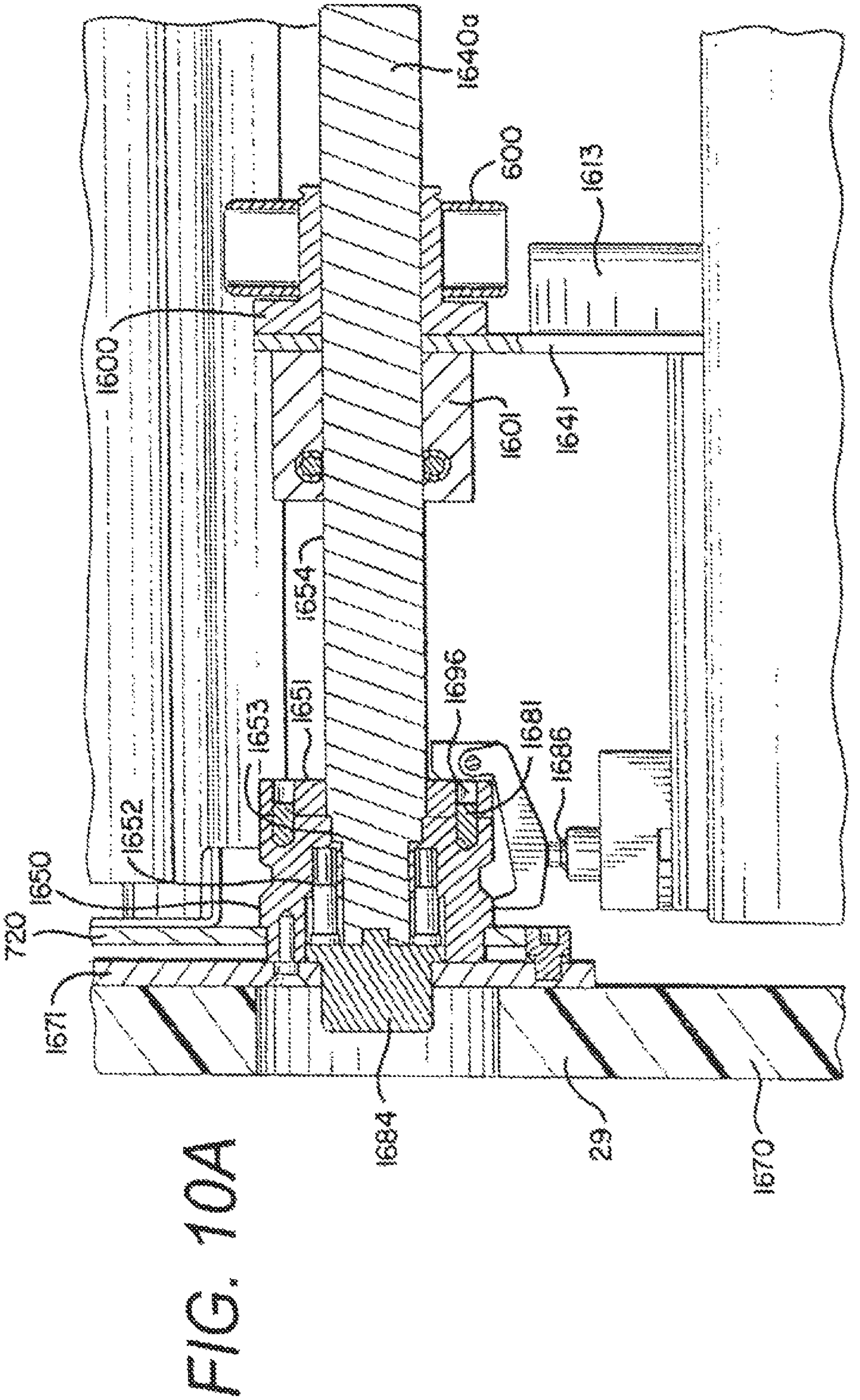
FIG. 10A is a partial cross-sectional view of the actuation mechanism and interlock mechanism for the foot-deck side rail of FIG. 9A in the locked position.
Figure 11A:
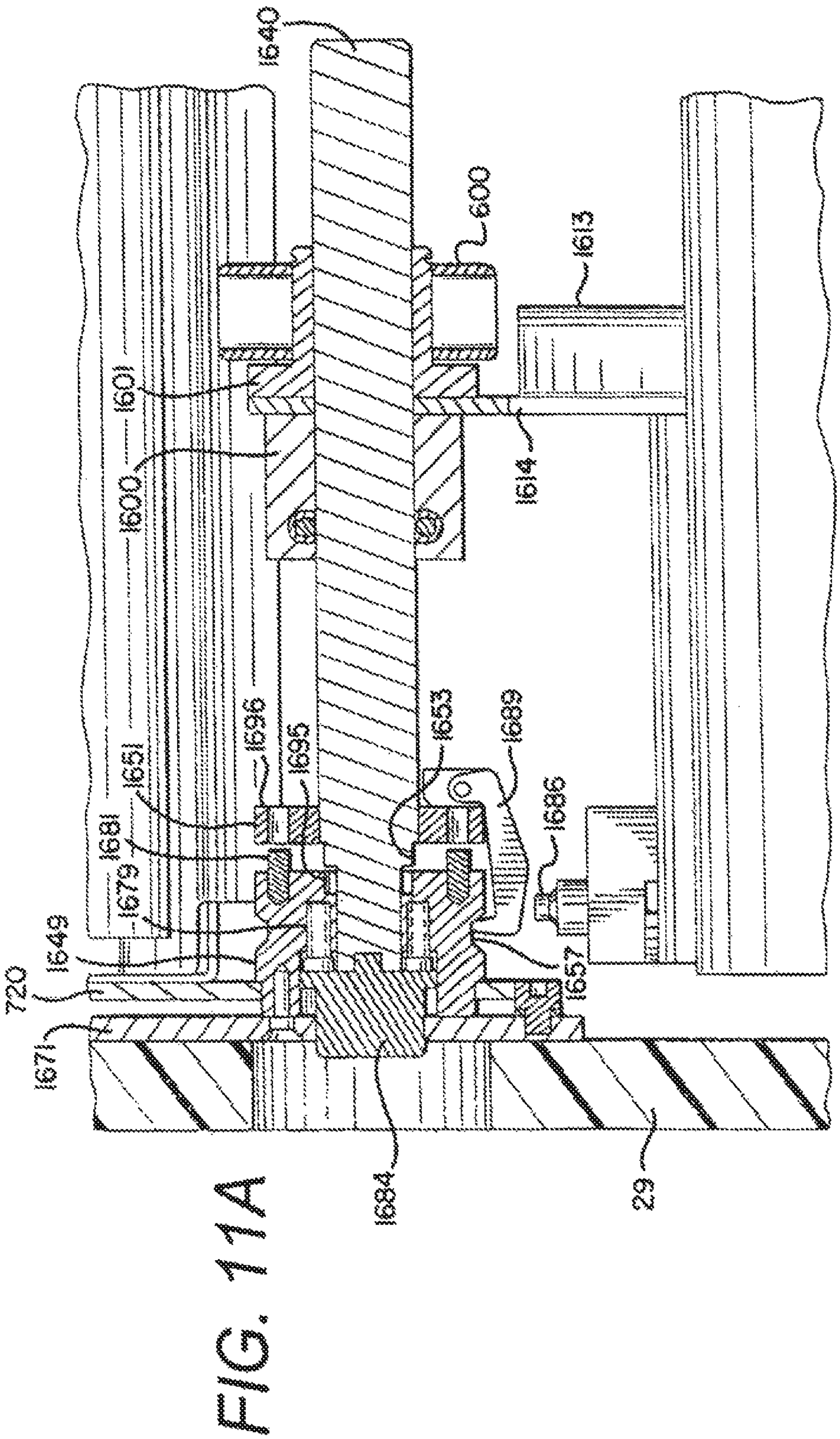
FIG. 11A is a partial cross-sectional view of the actuation mechanism and interlock mechanism for the foot-deck side rail of FIG. 9A in the unlocked position.

In one embodiment as best shown in FIGS. 10A and 11A, the locking mechanism and sensor assembly comprises the second coupling members 1650, an activator 1684, a first sensor 1686, and a follower arm 1689. The coupling member 1650 generally comprises an outer coupling member 1649 and an inner coupling member 1651, a plurality of springs 1679, and a plurality of mating members 1681 joining the outer coupling 1649 to the inner coupling 1651. The outer coupling member 1649 has an interior bore that accepts the cylindrical portion 1652 of the shaft 1640 as well as the activator 1684 and the springs 1679. The activator 1684 is connected to the end of the shaft 1640. The springs 1679 also reside in the bore in the outer coupling member 1649 to exert a force on the activator 1684 and the shaft 1640 to maintain the second coupling member 1650 in the engaged state. The outer coupling member 1649 also has a counterbore 1695 that has a cross-sectional geometry that matches the cross-sectional geometry of the first non-cylindrical portion 1653 of the shaft 1640. Further, the plurality of mating members 1681 extend from the side face of the outer coupling member 1649, and which are provided in a configuration identical to the configuration of apertures 1696 in the face of the inner coupling member 1651. In the engaged state the projections 1681 extending from the outer coupling member 1649 are positioned within mating apertures 1696 in the inner coupling member 1651. In such a configuration wherein the projections 1681 are provided within the apertures 1696 in the inner coupling member 1651, the shaft 1640*a*, 1640*b* is fixed to the siderail 1670, 1672. The configuration of the projections 1681 and mating apertures 1696 only allows engagement between the two components when the siderail 1670, 1672 is in the first position. Further, in the engaged first position the first non-cylindrical portion 1653 of the shaft drives the outer coupling member 1649 to drive the siderail 1670, 1672 therewith.

The siderail plate 1671 connects the siderail 1670, 1672, respectively to the outer coupling member 1649. Accordingly, when the outer coupling member 1649 is joined to the inner coupling member 1651, as shown in FIG. 10A, the siderail 1670 is rotationally fixed to the shaft 1640 and moves with the foot deck assembly 1206. Conversely, when the activator 1684 is pushed in and the inner coupling member 1651 is displaced from the outer coupling member 1649, the siderail 1670, 1672 is free to rotate independently from the shaft 1640 and the foot deck assembly 1206. The first position is the engaged position, wherein the projections 1681 extending from the outer coupling member 1649 are positioned within mating apertures 1696 in the inner coupling member 1651 to fix the siderails relative to the foot deck section 1206. The second position is the disengaged position, wherein the inner coupling member 1651 and its apertures 1696 are spaced a distance from the mating projections 1681 of the outer coupling member 1649, and thus they are not engaged thereby. This allows the siderail plate 1671, the outer coupling member 1649 and the siderail 1670, 1672 to rotate freely. To move the shaft 1640 axially or laterally inward, thereby displacing the inner coupling member 1651 and placing the assembly in the disengaged state, the activator 1684 is pushed in as shown in FIG. 11A. The activator 1684 operates to enable the siderail 1670, 1672 to change from the engaged state to the disengaged state.

As shown in FIGS. 9A, 10A and 11A, in one embodiment, the outer coupling member 1649 has a groove 1657 in its outer wall. In the engaged position of FIG. 10A, the follower arm 1689 is positioned outside of the groove 1657. In this position the follower arm 1689 engages the sensor 1686, which signals the bed system that the siderail 1670, 1672 is in the up position (i.e., the siderail is engaged to the foot deck assembly 1206) and the seat deck extenders are in the retracted position. In this engaged state the foot deck 1206 is free to transition to the chair orientation. This first sensor 1686 is typically a switch that is engaged by the follower arm 1689. When the switch 1686 does not sense the existence of the follower arm 1689 in the engaged position, the sensor 1686 sends a signal to a controller of the bed to lock out or preclude the foot deck actuator 1186 from moving the foot deck section 1206 into the substantially vertical position of a chair configuration.

Additionally, a mechanical stop is utilized to preclude the foot deck siderails 1670, 1672 from being rotated to the second lower position when the foot deck 1206 is in the vertical chair position. In one embodiment the mechanical stop prohibits the activator 1684 from being pushed inwardly when the foot deck 1206 is in the chair position. Accordingly, various stops/sensors of the bed 10, both electrical and mechanical, operate to only allow the foot deck siderails 1670, 1672 from being manipulated to the second position at certain positions of the foot deck 1206 (generally when the foot deck section 1206 is less than 35° form the horizontal position).

Figure 10B:
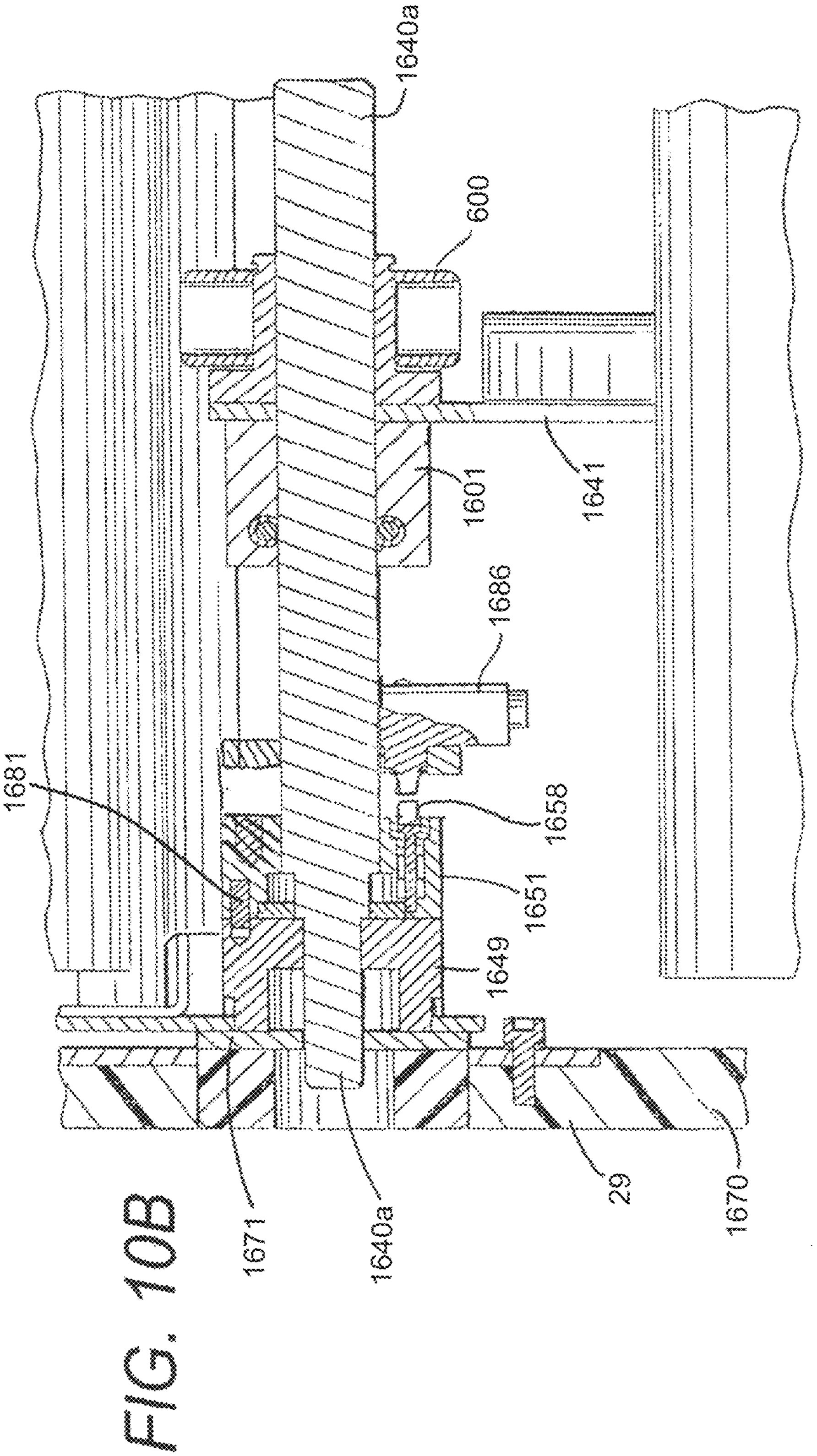
FIG. 10B is a partial cross-sectional view of the actuation mechanism and interlock mechanism for the foot-deck side rail of FIG. 9B in the locked position.
Figure 11B:
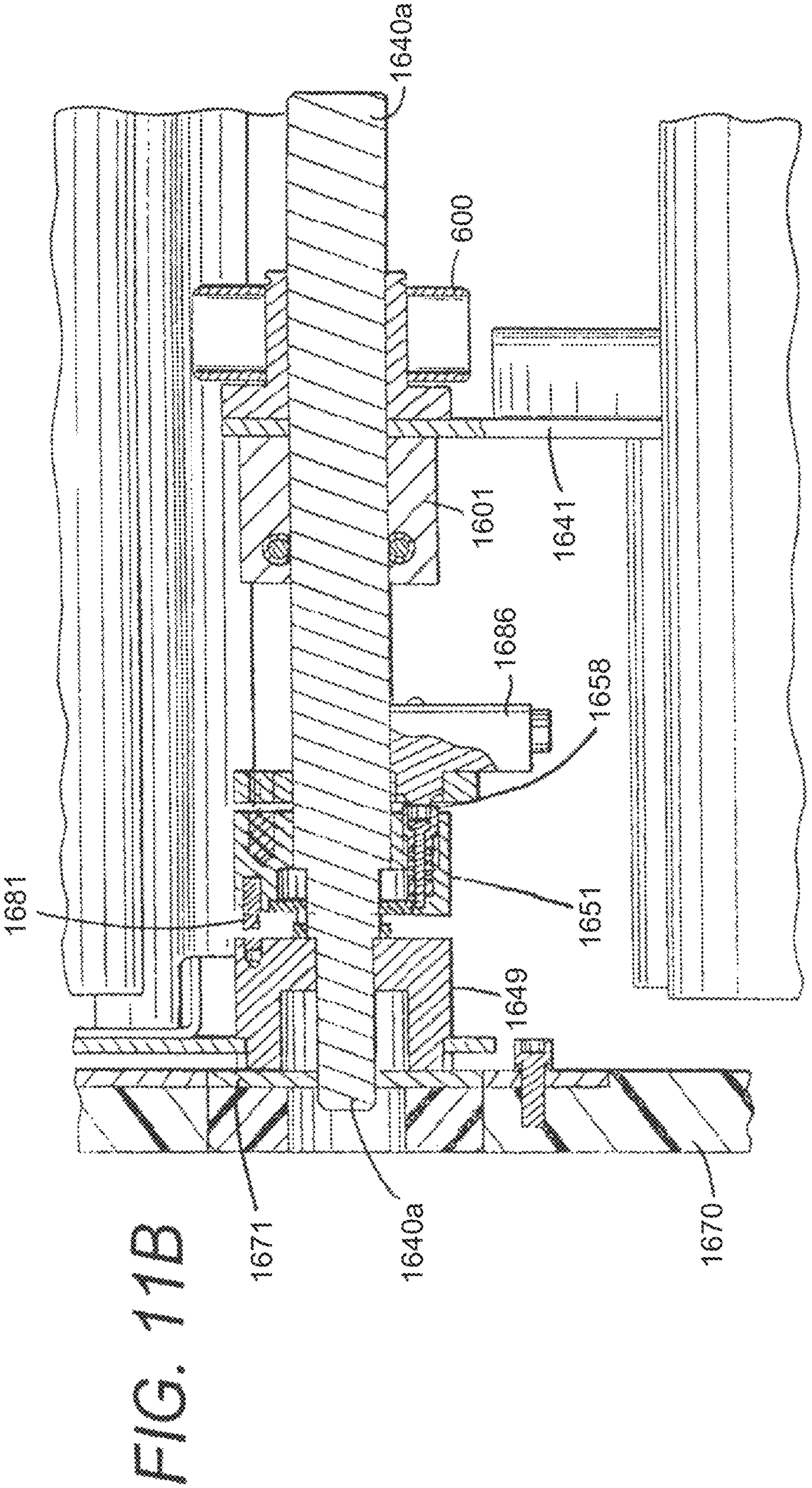
FIG. 11B is a partial cross-sectional view of the actuation mechanism and interlock mechanism for the foot-deck side rail of FIG. 9B in the unlocked position.

In an alternate embodiment, as shown in FIGS. 9B, 10B and 11B, an alternate locking mechanism and sensor assembly are provided. In this embodiment the locking mechanism and sensor assembly comprises a second coupling member 1650, an inner coupling 1651, and a first sensor 1686 connected to the inner coupling 1651. Accordingly, unlike the prior embodiment, no follower arm 1689 is required and the coupling member 1650 of this embodiment does not have a groove 1657 in the outer wall of the outer coupling member 1649.

In the embodiment of FIGS. 9B, 10B and 11B, the coupling member 1650 generally comprises an outer coupling member 1649 and an inner coupling member 1651. The locking mechanism also has a plurality of springs 1679 and a plurality of mating members 1681 joining the outer coupling 1649 to the inner coupling 1651. The outer coupling member 1649 has an interior bore that accepts the cylindrical portion 1652 of the shaft 1640.

The plurality of mating members 1681 extend from the side face of the outer coupling member 1649, and are provided in a configuration identical to the configuration of apertures 1696 in the face of the inner coupling member 1651. As shown in FIG. 10B, in the engaged state the projections 1681 extending from the outer coupling member 1649 are positioned within mating apertures 1696 in the inner coupling member 1651. In such a configuration wherein the projections 1681 are provided within the apertures 1696 in the inner coupling member 1651, the shaft 1640*a*, 1640*b* is fixed to the siderail 1670, 1672. The configuration of the projections 1681 and mating apertures 1696 only allows engagement between the two components when the siderail 1670, 1672 is in the first position. Further, in the engaged first position the first non-cylindrical portion 1653 of the shaft drives the outer coupling member 1649 to drive the siderail 1670, 1672 therewith.

The siderail plate 1671 connects the siderail 1670, 1672, respectively to the outer coupling member 1649. Accordingly, when the outer coupling member 1649 is joined to the inner coupling member 1651, as shown in FIG. 10B, the siderail 1670 is rotationally fixed to the shaft 1640 and moves with the foot deck assembly 1206. Conversely, when the shaft 1640 is pushed in and the inner coupling member 1651 is displaced from the outer coupling member 1649, the siderail 1670, 1672 is free to rotate independently from the shaft 1640 and the foot deck assembly 1206. The first position is the engaged position, wherein the projections 1681 extending from the outer coupling member 1649 are positioned within mating apertures 1696 in the inner coupling member 1651 to fix the siderails relative to the foot deck section 1206. The second position, shown in FIG. 11B, is the disengaged position, wherein the inner coupling member 1651 and its apertures 1696 are spaced a distance from the mating projections 1681 of the outer coupling member 1649, and thus they are not engaged thereby. This allows the siderail plate 1671, the outer coupling member 1649 and the siderail 1670, 1672 to rotate freely. To move the shaft 1640 axially or laterally inward, thereby displacing the inner coupling member 1651 and placing the assembly in the disengaged state, the shaft 1640 is pushed in as shown in FIG. 11B.

As shown in FIGS. 10B and 11B, a protrusion 1658 extends from the inner coupling 1651. In the disengaged state, shown in FIG. 11B, the protrusion 1658 engages the sensor 1686, which signals the bed system that the siderail 1670, 1672 is in the down position (i.e., the siderail is disengaged from the foot deck assembly 1206). In this disengaged state, the sensor 1686 sends a signal to a controller of the bed to lock out or preclude the foot deck actuator 1186 from moving the foot deck section 1206 into the substantially vertical position of a chair configuration.

Accordingly, in the preferred embodiment the foot end siderails 1670, 1672, or alternately handles, are generally rotatably coupled to the foot deck section 1206, unless disengaged therefrom as explained above. Each siderail 1670, 1672 generally comprises a siderail plate 1671 and a barrier 1708. The siderail plate 1671 is generally connected to the second coupling member 1650. And, in one embodiment, another plate 720 connects the siderail assembly 29 to the seat deck extender assemblies 432, 434. As such, when the seat deck extender assemblies 432, 434 are extended, the second set of siderails 29 will simultaneously be extended outwardly as well. An interlock switch is provided to preclude movement of the foot deck section 1206 to the full chair position when the seat deck extender assemblies 432, 434 are in the extended position, however, the bed can transition to the cardiac position or knee-gatch position when the seat deck extenders are extended.

The siderails 1670, 1672 are provided not only as barriers, but as handles to assist the patient in moving out of the foot end 26 of the chair bed 10. Because the siderails 1670, 1672 are fixed to the shaft 1640*a*, 1640*b* in the engaged state, and because the shaft 1640*a*, 1640*b* is fixed to the foot deck section 1206 through the drive rails 1613, in the engaged state, the siderails 1670, 1672 are also fixed to the foot deck section 1206 and have relative movement with the foot deck section 1206. Thus, as the foot deck section 1206 is rotated from the generally horizontal position to the substantially vertical position, the foot end siderails 1670, 1672 also rotate therewith. The patient can hold onto the foot end siderails 1670, 1672 during this rotation to advance the patient toward the foot end 26 of the chair bed 10 for easier exit therefrom and entrance thereto. The patient can also grasp the siderails as handles when exiting and entering the chair bed 10.

Further, because the foot end siderails 1670, 1672 are independently fixed to their respective shaft 1640*a*, 1640*b*, the foot end siderails 1670, 1672 move from their first position to their second position through rotational movement. Thus, the barrier portion 1708 of the siderails 1670, 1672 moves in a single vertical plane from the first position above the support deck 20 to the second position below the support deck to provide full access to the patient on the top surface of the mattress 22. The barrier portion 1708 is configured to be conveniently gripped by the patient while entering and exiting the bed. Additionally, in alternate embodiments controls (such as a control button or switch) and/or a controller are integral with any of the siderail assemblies identified herein. Such controls may be provided in the foot end siderails 1670, 1672 and utilized to lower the foot deck section 1206 from the generally horizontal position to the substantially vertical position. By having controls in the siderail assemblies the patient can hold onto the foot end siderails 1670, 1672 and lower the foot deck section 1206 simultaneously at a controlled rate to assist in both rotating the foot deck section 1206 and advancing the patient toward the foot end 26 of the bed for easier exit therefrom.

Each of the foot end siderails 1670, 1672 can also independently slide inward and outward about the axis of their respective shafts 1640*a*, 1640*b*. In one embodiment the foot end siderails 1670, 1672 are connected to their respective seat deck extender assemblies with a plate 720. Thus, as either of the seat deck extender assemblies 432, 434 are extended outwardly to increase the width of the bed, the foot end siderail 1670, 1672 at that side of the bed will also move outwardly. To accomplish such, each shaft 1640*a*, 1640*b* merely independently slides about its axis such within the first coupling member 1600. When the seat deck extender assemblies 432, 434 are pushed back inward to their first position, the foot end siderails 1670, 1672 will also move inwardly therewith to their standard position.

The bed 10 also incorporates a variety of lock-out features. For example, when the foot end siderails 29 or handles are in the second or down position, the foot actuator 1186 is locked out and cannot transition the foot deck 1206 to the full chair position.

As explained above, the bed also has a first set of siderails 27. In one embodiment the first set of siderails 27 are provided toward the head end 24 of the bed. The first set of siderails 27 generally comprise a first head end siderail 800 located at the first side 28 of the bed, and a second head end siderail 802 located at the second side 30 of the bed. In one embodiment, the head end siderails 800, 802 are operably connected to the head deck section 202 of the bed and remain stationary relative to the head deck section 202 during movement of the head deck section 202 between the generally horizontal position and a more vertical back support position. In alternate embodiments, either of the sets of siderails 27, 29 may be connected to any frame of the bed, but they are preferable connected to the patient support platform 20. Additionally, the head end siderails 800, 802 may be connected to the seat deck section 204, the seat deck extenders, or any other support deck. In a preferred embodiment the first head end siderail 800 is connected to the first side head deck extender assembly 232, and the second head end siderail 802 is connected to the second side head deck extender assembly 234. The first and second head end siderails 800, 802 are moveable from a first position (see FIG. 1), wherein they generally provide a barrier preventing the patient from unintentional exit off the bed at either of the sides 28, 30 thereof, to a second position, wherein a barrier is not provided above the patient support surface. Each of the head end siderails 800, 802 are independently moveable from the first position to the second position. In both the first and second positions the head end siderails 800, 802 are adapted to remain stationary relative to the head deck section 202 during movement of the foot deck section 1206.

As previously disclosed, the bed 10 has a patient support assembly 19, which in some embodiments includes a mattress 22. One embodiment of a mattress 22 for the bed 10 is shown in FIGS. 1 and 2. The mattress 22 is provided on the deck plates of the head deck, seat deck and foot deck sections 202, 204, 1206, and over the bridge 1209 adjacent the gap 1205. Though the mattress is a single component in many embodiments, it will be identified as having a head mattress portion 850, a seat mattress portion 852 and a foot mattress portion 854. Additionally, the mattress 22 includes an encasing 856 that generally covers the entire mattress 22. Referring to FIGS. 1 and 2, in one embodiment at least a first portion 1800 of the mattress 22 is made of a foam component, and a second portion 1802 of the mattress 22 is made of an air component 1806. In a preferred embodiment, the first portion 1800 is made solely of a foam component portion 1804. This foam component is preferably a viscoelastic foam having an indentation load depth (I.L.D.) in the range of 20-60 I.L.D., and preferably in the range of 20-40 I.L.D., however alternate densities are possible without departing from the scope of the present invention. In a preferred embodiment the head mattress portion 850 and seat mattress portion 852 are manufactured of a unitary foam member. In a preferred embodiment of the mattress 22, the mattress 22 has a thickness (T) of approximately 6". In an alternate embodiment the foam member may be comprised of a softer upper foam layer 868 being approximately 2" thick, and the denser lower foam layer being approximately 4" thick. The upper foam layer is generally glued or otherwise attached to the lower foam layer to form an integral mattress component 22. The foot mattress portion 854 that covers the gap 1205 and the foot deck 1206 is generally 5" thick, because in one embodiment the foot deck 1206 in one embodiment as shown in FIG. 6A is provided approximately 1" above the plane of the seat deck 204. In a preferred embodiment the foot mattress portion 854 comprises a lower foam portion 1810 that is approximately 1-2" thick, which is preferably a highly compressible foam having a low I.L.D., and an upper air cell portion 1812 that is approximately 3-4" thick. In a most preferred embodiment the upper air cell portion 1812 comprises a closed-cell section made up of a plurality of independent non-powered air cells, such as the Dry Flotation® mattress made by the Roho Group, Belleville, IL One such Dry Flotation® mattress is approximately 3.5" thick. Accordingly, the top surface of the entire mattress is generally the same height over the head 202, seat 204 and foot 1206 sections. As shown in FIGS. 2 and 5, the air cell section 1812 at the foot deck 1206 area of the bed 10, and specifically over the bend at the edge of the foot deck 1206 provides a more comfortable knee section for the user. In an alternate embodiment, the construction of the mattress at the foot end may extend partially into the seat deck section. Further, in another alternate embodiment the entire insert for the mattress section 22 may be made of foam. Additionally, the air cell section 1812 at the foot deck 1206 section of the bed 10 provides therapeutic benefits for the heels and lower portions of the patient's legs. The entire mattress 22 is fitted into a closable mattress encasing 856, and the encasing is strapped to the various sections of the bed 10.

In use, as the foot deck section 1206 of the support deck 20 is rotated downwards into the chair position, the air cell portion 1812 of the mattress will bend more easily around the raised head end edge of the foot deck (see FIGS. 5 and 6C), and specifically around the raised foam member 1208 at the edge of the foot deck plate 1207. The raised edge of the foot deck plate 1207 provides a firm support for patients as they enter and exit the chair bed.

Figure 13:
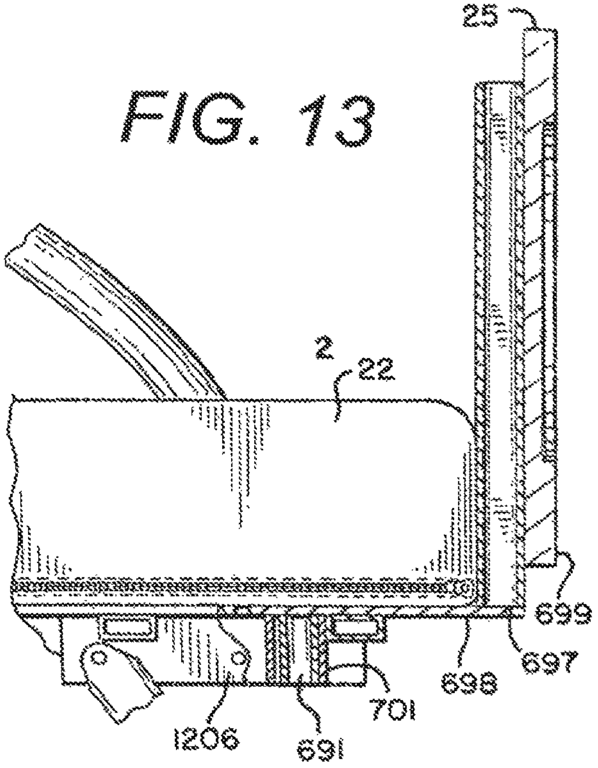
FIG. 13 is a partial cross-sectional view of the foot board inserted in the foot deck of one embodiment of the hospital bed.
Figure 12:
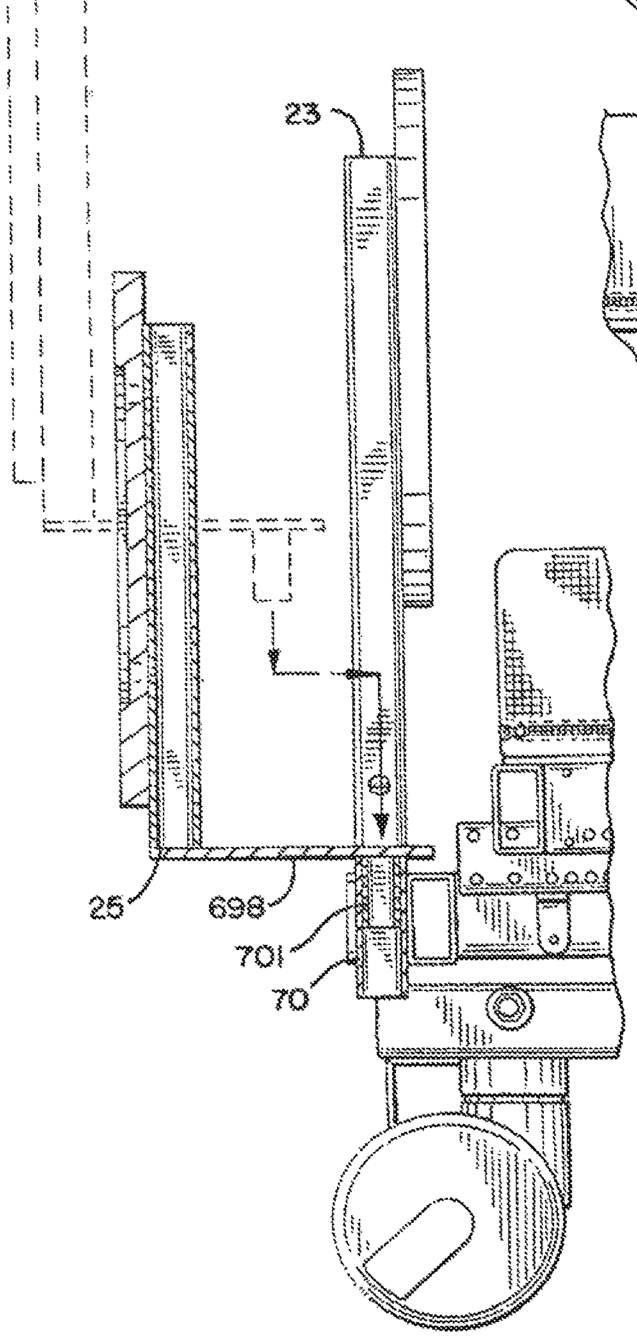
FIG. 12 is a schematic view of the insertion of the foot board adjacent the head board of one embodiment of the hospital bed.
Figure 14:
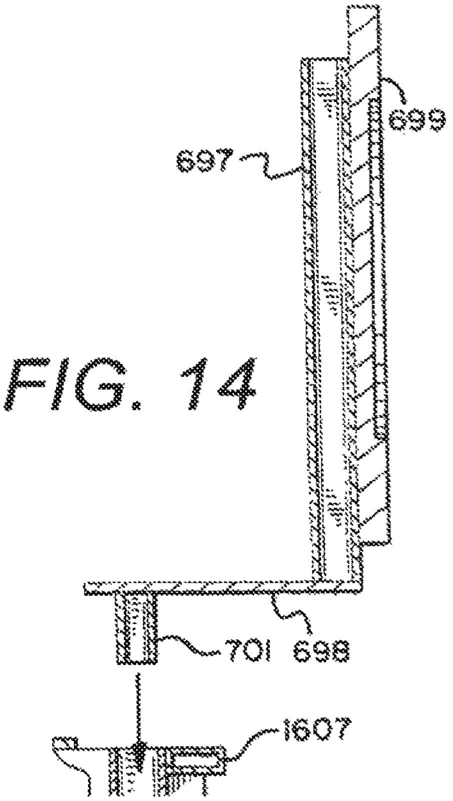
FIG. 14 is a partial cross-sectional view of the foot board and foot deck prior to insertion of the foot board in the foot deck of one embodiment of the hospital bed.

In one embodiment, the footboard 25, as shown in FIGS. 12-14 is removably connected to the foot deck section 1206. The footboard 25 generally comprises a footboard frame or support member 697, having first and second arms, and a footboard barrier 699. The footboard barrier 699 is generally fixedly connected to the footboard frame 697. In one embodiment the footboard 25 has a transverse member 698 that operates as an auxiliary deck plate at the end of the foot deck 1206 to support the mattress 22. Preferably, the footboard 25 has two transverse members 698, as shown in FIGS. 1 and 14, which operate as an auxiliary deck plate at the foot end 26 of the foot deck frame 1604. Accordingly, when the foot deck 25 is removed, the mattress 22 extends beyond the foot deck 1206 and is cantilevered at the very foot end 26 of the bed 10. A projection 701 extends from each transverse members 698. The projections 701 extend into apertures 691 at the foot end 26 of the foot deck frame 1604. Typically, the footboard 25 is only connected to the bed 10 when the support assembly 19 is in the horizontal or flat position, or in the cardiac or vascular bed position. The bed 10 contains a sensor that can sense the existence of the footboard 25 being connected to the bed 10. When the sensor senses the footboard 25 connected to the bed 10, the actuators of the bed 10 prevent the bed 10 from being positioned into the full chair position (i.e., the foot deck actuator 186 is precluded from moving the foot deck section 1206 into the substantially vertical position of a chair configuration). In a preferred embodiment, when the footboard 25 is connected to the foot deck 1206 the bed controller precludes the foot deck 1206 from rotating beyond 30°-35° from the horizontal plane (i.e., approximately the knee-gatch and cardiac positions). Conversely, when the sensor senses that the footboard 25 is not connected to the bed 10, the bed 10 is free to be reconfigured into the chair configuration. Accordingly, to transition the bed 10 to the full chair position the footboard 25 must be removed.

In a preferred embodiment, when the footboard 25 is removed from its engagement with the foot deck 1206 it can be relocated at the head end 24 of the bed 10, and most preferably adjacent the head board of the bed 10. As shown in FIG. 12, in one embodiment the footboard 25 can be secured to the weigh frame 70 by inserting the projections 701 into apertures in the weigh frame 70.

While different beds are referenced herein, such as a standard bed 10, a chair bed, an expanding width bed, etc. it is understood that any feature disclosed herein may be utilized with any type patient support mechanism, and reference to one type of bed respecting a particular feature does not preclude incorporation of that feature into any other type of bed.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms “first,” “second,” “third,” and “fourth” as used herein are intended for illustrative purposes only and do not limit the embodiments in any way. Further, the term “plurality” as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A hospital bed, comprising:

a base frame assembly;

an intermediate frame assembly coupled to the base frame assembly;

a patient support assembly coupled to the intermediate frame assembly, and a weigh frame assembly is positioned between the intermediate frame assembly and the patient support assembly, wherein the intermediate frame assembly is raised to a raised position and lowered to a lowered position via a plurality of arm assemblies and a plurality of actuators connected to the base frame assembly to allow the intermediate frame assembly to nest within the base frame assembly in the lowered position, wherein in a lowered-most position, portions of the intermediate frame assembly are lower than portions of the base frame assembly.

2. The hospital bed of claim 1, wherein the plurality of actuators include a first actuator to raise and lower a head end of the intermediate frame assembly, and a second actuator to raise and lower a foot end of the intermediate frame assembly.

3. The hospital bed of claim 2, wherein the plurality of arm assemblies include a first arm assembly and a second arm assembly, the first arm assembly connected to a head end of the intermediate frame assembly and the first actuator, the second arm assembly connected to a foot end of the intermediate frame assembly and the second actuator.

4. The hospital bed of claim 3, wherein the first arm assembly and the second arm assembly reside generally inline with the intermediate frame assembly.

5. The hospital bed of claim 1, further including a patient support deck coupled to the patient support assembly, the patient support deck having a head deck section, a seat deck section, and a foot deck section, the head deck section located adjacent a head end of the hospital bed, the foot deck section located adjacent a foot end of the hospital bed, the seat deck section being between the head deck section and the foot deck section, the patient support deck is convertible to an expanding width bed configuration, wherein the patient support deck converts to a wider patient support surface at various sections of the hospital bed.

6. The hospital bed of claim 5, wherein the head deck section includes a first side head deck extender assembly and a second side head deck extender assembly, the first side head deck extender assembly utilized to increase a width of the hospital bed at a first side of the hospital bed, and the second side head deck extender assembly utilized to increase the width of the hospital bed at a second side of the hospital bed.

7. The hospital bed of claim 6, wherein the first and second side head deck extender assemblies are independently moveable from a first retracted position to a second expanded position.

8. The hospital bed of claim 5, wherein the seat deck section includes a first side seat deck extender assembly and a second side seat deck extender assembly, the first side seat deck extender assembly utilized to increase a width of the hospital bed at a first side of the hospital bed, and the second side seat deck extender assembly utilized to increase the width of the hospital bed at a second side of the hospital bed.

9. The hospital bed of claim 8, wherein the first and second side seat deck extender assemblies are independently moveable from a first retracted position to a second expanded position.

10. The hospital bed of claim 1, wherein the weigh frame assembly is coupled to the intermediate frame assembly by a plurality of load cells or load beams and the patient support assembly is coupled to the weigh frame assembly by a plurality of actuators that raise and lower a head section, an intermediate section, and a foot section of the hospital bed at various angular orientations.

11. The hospital bed of claim 1, further including a first side rail and a second side rail.

12. A hospital bed, comprising:

a base frame assembly, an intermediate frame assembly coupled to the base frame assembly, a weigh frame assembly coupled to the intermediate frame assembly by a plurality of load beams, a patient support assembly coupled to the weigh frame assembly, wherein the weigh frame assembly is positioned between the intermediate frame assembly and the patient support assembly, wherein the intermediate frame assembly is raised to a raised position and lowered to a lowered position via a plurality of arm assemblies and a plurality of actuators connected to the base frame assembly to allow the intermediate frame assembly to nest within the base frame assembly in the lowered position, and a patient support deck coupled to the patient support assembly, the patient support deck having a head deck section, a seat deck section, and a foot deck section, the head deck section located adjacent a head end of the hospital bed, the foot deck section located adjacent a foot end of the hospital bed, the seat deck section being between the head deck section and the foot deck section, the head deck section, the seat deck section, and the foot deck section can be positioned in a chair configuration wherein the foot deck section is substantially vertical.

13. The hospital bed of claim 12, wherein the plurality of actuators include a first actuator to raise and lower a head end of the intermediate frame assembly, and a second actuator to raise and lower a foot end of the intermediate frame assembly.

14. The hospital bed of claim 13, wherein the plurality of arm assemblies include a first arm assembly and a second arm assembly, the first arm assembly connected to a head end of the intermediate frame assembly and the first actuator, the second arm assembly connected to a foot end of the intermediate frame assembly and the second actuator.

15. The hospital bed of claim 14, wherein the first arm assembly and the second arm assembly reside generally inline with the intermediate frame assembly.

16. The hospital bed of claim 12, wherein the patient support deck is convertible to an expanding width bed configuration, wherein the patient support deck converts to a wider patient support surface at one or more sections of the hospital bed.

17. The hospital bed of claim 12, wherein the head deck section includes a first side head deck extender assembly and a second side head deck extender assembly, the first side head deck extender assembly utilized to increase a width of the hospital bed at a first side of the hospital bed, and the second side head deck extender assembly utilized to increase the width of the hospital bed at a second side of the hospital bed.

18. The hospital bed of claim 17, wherein the first and second side head deck extender assemblies are independently moveable from a first retracted position to a second expanded position.

19. The hospital bed of claim 12, wherein the seat deck section includes a first side seat deck extender assembly and a second side seat deck extender assembly, the first side seat deck extender assembly utilized to increase a width of the hospital bed at a first side of the hospital bed, and the second side seat deck extender assembly utilized to increase the width of the hospital bed at a second side of the hospital bed.

20. The hospital bed of claim 19, wherein the first and second side seat deck extender assemblies are independently moveable from a first retracted position to a second expanded position.

21. The hospital bed of claim 12, wherein the weigh frame assembly is coupled to the intermediate frame assembly by a plurality of load cells or load beams and the patient support assembly is coupled to the weigh frame assembly by a plurality of actuators that raise and lower a head section, an intermediate section, and a foot section of the hospital bed at various angular orientations.

22. The hospital bed of claim 12, further including a first side rail and a second side rail.

* * * * *